(12) United States Patent
Ozeki et al.

(10) Patent No.: US 11,192,426 B2
(45) Date of Patent: Dec. 7, 2021

(54) COOLING SYSTEM

(71) Applicant: YAMADA MANUFACTURING CO., LTD., Kiryu (JP)

(72) Inventors: Akifumi Ozeki, Kiryu (JP); Toshihito Nagai, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 313 days.

(21) Appl. No.: 16/229,495

(22) Filed: Dec. 21, 2018

(65) Prior Publication Data

US 2019/0291535 A1 Sep. 26, 2019

(30) Foreign Application Priority Data

Mar. 26, 2018 (JP) .............................. JP2018-058727
May 17, 2018 (JP) .............................. JP2018-095542

(51) Int. Cl.
| | |
|---|---|
| *B60H 1/00* | (2006.01) |
| *F28F 27/02* | (2006.01) |
| *B60H 1/08* | (2006.01) |
| *F01P 7/16* | (2006.01) |
| *F01P 11/10* | (2006.01) |
| *F01P 11/16* | (2006.01) |
| *F01P 3/18* | (2006.01) |

(52) U.S. Cl.
CPC ..... *B60H 1/00314* (2013.01); *B60H 1/00328* (2013.01); *B60H 1/00485* (2013.01); *B60H 1/08* (2013.01); *F01P 3/18* (2013.01); *F01P 7/165* (2013.01); *F01P 11/10* (2013.01); *F01P 11/16* (2013.01); *F28F 27/02* (2013.01); *F01P 2060/08* (2013.01); *F28F 2250/06* (2013.01)

(58) Field of Classification Search
CPC ............ B60H 1/00314; B60H 1/00328; B60H 1/00485; B60H 1/08; F01P 3/18; F01P 7/165; F01P 11/10; F01P 11/16; F01P 2060/08; F28F 27/02; F28F 2250/06
USPC ........................................................ 165/283
See application file for complete search history.

(56) References Cited

U.S. PATENT DOCUMENTS

| | | | | |
|---|---|---|---|---|
| 4,129,995 A | * | 12/1978 | Usami ..................... | F25B 41/22 62/217 |
| 4,982,895 A | * | 1/1991 | Shimizu ............. | B60H 1/00314 237/12.3 A |
| 6,032,869 A | * | 3/2000 | Ito ...................... | B60H 1/00314 165/103 |
| 6,571,752 B1 | * | 6/2003 | Suzuki .................... | F01P 11/20 123/142.5 R |

(Continued)

FOREIGN PATENT DOCUMENTS

JP    2016-156340    9/2016

*Primary Examiner* — Tho V Duong
*Assistant Examiner* — Raheena R Malik
(74) *Attorney, Agent, or Firm* — Rankin, Hill & Clark LLP

(57) ABSTRACT

A control apparatus in a cooling system has an opening schedule of a degree of opening of each of a plurality of outflow ports in a control valve including at least a heater cut mode, a heater passing water mode, a fully closed mode, and a switching mode in which the opening and closing of an air conditioning outflow port is switched in a state in which at least one outflow port of a radiator outflow port and a bypass outflow port is opened and switches the heater cut mode and the heater passing water mode via the switching mode.

5 Claims, 11 Drawing Sheets

(56) References Cited

U.S. PATENT DOCUMENTS

| | | | | |
|---|---|---|---|---|
| 7,621,128 B2* | 11/2009 | Czarnowski | ............ | F01N 3/021 |
| | | | | 60/605.2 |
| 2011/0232590 A1* | 9/2011 | Benet | ........................ | F01P 3/20 |
| | | | | 123/41.09 |
| 2017/0159545 A1* | 6/2017 | Onishi | ............... | B60H 1/32281 |
| 2017/0210203 A1* | 7/2017 | Quix | ........................ | B60H 1/08 |
| 2019/0308490 A1* | 10/2019 | Obuchi | .................... | B60K 6/22 |

* cited by examiner

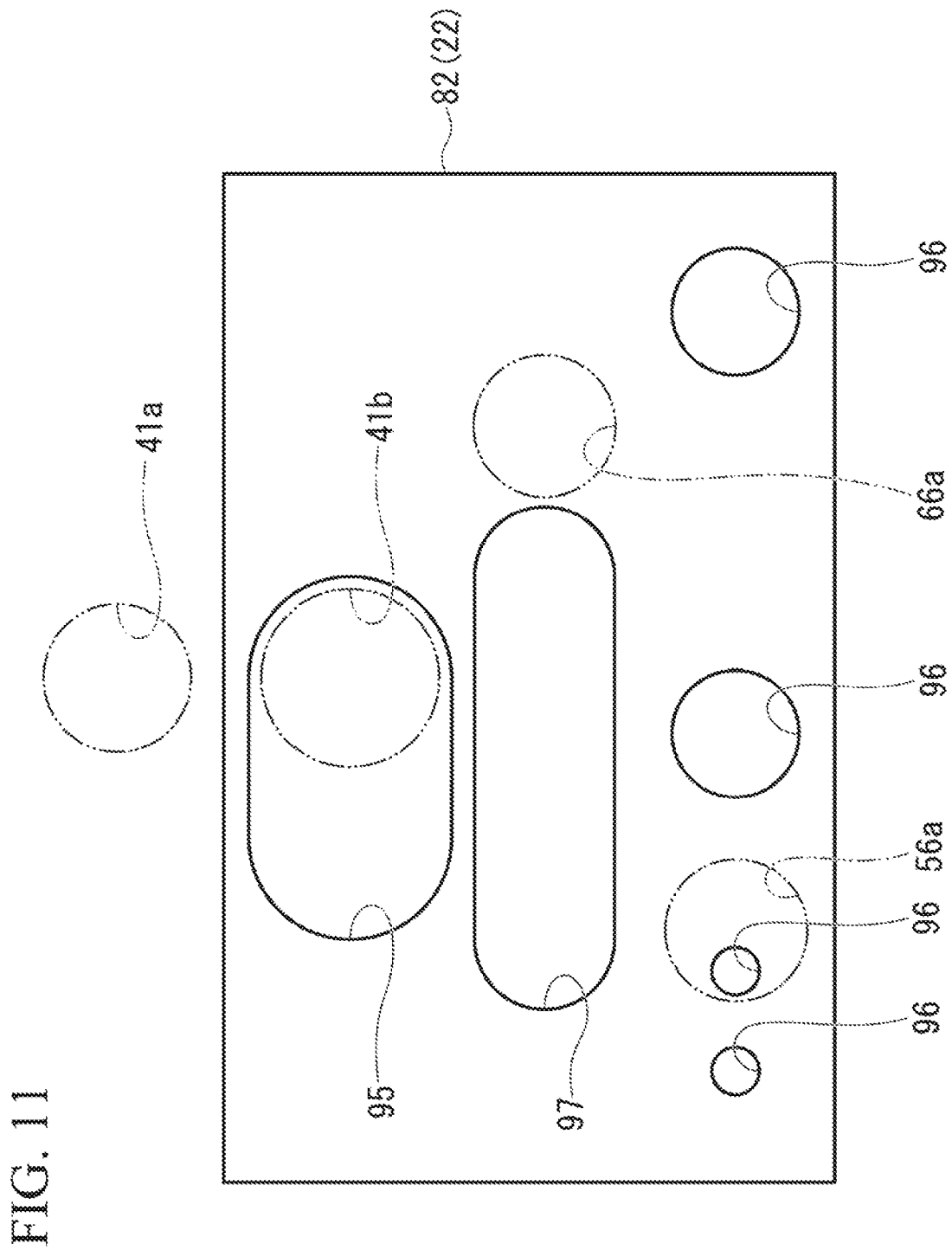

COOLING SYSTEM

CROSS-REFERENCE TO RELATED APPLICATION

Priority is claimed on Japanese Patent Application Nos. 2018-058727 and 2018-095542, filed Mar. 26, 2018 and May 17, 2018, the content of which is incorporated herein by reference.

BACKGROUND

Field of the Invention

The present invention relates to a cooling system

Description of Related Art

In the related art, a cooling system configured to cool an engine using cooling water is known. In this type of cooling system, a plurality of heat exchange flow paths through which cooling water circulates are provided between various heat exchangers separately from a radiator flow path circulating between a radiator and an engine in some cases.

In such a cooling system, a control valve configured to cool the flow of cooling water to each flow path is provided at a portion branching to each flow path (radiator flow path, heat exchange flow path, and the like). A conventional technique for controlling this control valve is described in, for example, Japanese Unexamined Patent Application, First Publication No. 2016-156340 (hereinafter referred to as Patent Document 1).

SUMMARY

However, the above-described conventional technique described in Patent Document 1 waits until a water temperature of cooling water is a specified value or less and switches a mode to prevent boiling of the cooling water when the water temperature of the cooling water exceeds a specified value at the time of switching from a heater cut mode to a heater passing water mode. Thus, it takes time to switch from the heater cut mode to the heater passing water mode. The heater cut mode is a mode in which cooling water does not flow through an air conditioning flow path having an air conditioning heater provided therein, that is, water does not pass through the heater. The heater passing water mode is a mode in which cooling water flows through the air conditioning flow path through which water passes to the heater. Therefore, in the above-described conventional technique described in Patent Document 1, when a water temperature of cooling water exceeds a specified value, even when a user performs an operation to request heating, it takes time until a heater actually starts heating, which is inconvenient for the user.

An aspect associated with the present invention was made in view of such circumstances and an objective of the present invention is to provide a cooling system capable of shortening a time requiring for switching between a heater cut mode and a heater passing water mode.

In order to achieve the above-described objective, the present invention adopts the following aspects.

(1) A cooling system of an aspect associated with the present invention includes: a cooling flow path through which cooling water flows to cool an engine; a plurality of branch flow paths through which the cooling water discharged through an outlet of the cooling flow path is returned to an inlet of the cooling flow path and which have a radiator flow path including a radiator configured to radiate heat of the cooling water, an air conditioning flow path including an air conditioning heater, and a bypass flow path including a device configured to exchange heat with the cooling water; a control valve provided at a branching place in the branch flow path; and a control apparatus configured to control the control valve, wherein the control valve includes an inflow port into which the cooling water discharged through the outlet of the cooling flow path flows and a plurality of outflow ports through which the cooling water flowing into the inflow port is supplied to a plurality of branch flow paths and changes a degree of opening of each of the plurality of outflow ports in accordance with control performed by the control apparatus, the control apparatus includes: an opening schedule data storage unit configured to store opening schedule data indicating an opening schedule of the degree of opening of each of the plurality of the control valves including at least a heater cut mode in which a radiator outflow port through which the cooling water is supplied to the radiator flow path is open in a state in which an air conditioning outflow port through which the cooling water is supplied to the air conditioning flow path is closed, a heater passing water mode in which the radiator outflow port is open in a state in which the air conditioning outflow port is open, a fully closed mode in which all of a bypass outflow port through which the cooling water is supplied to the bypass flow path, the radiator outflow port, and the air conditioning outflow port are closed, and a switching mode in which opening and closing of the air conditioning outflow port are switched in a state in which at least one outflow port of the radiator outflow port and the bypass outflow port is open; and an opening degree control unit configured to switch between the heater cut mode and the heater passing water mode via the switching mode.

(2) In the above (1), in the cooling system, the opening degree control unit may switch between the heater cut mode and the heater passing water mode without passing through the fully closed mode and with passing through the switching mode when a water temperature of the cooling water exceeds a specified value.

(3) In the above (2), in the cooling system, the opening degree control unit may switch between the heater cut mode and the heater passing water mode with passing through the fully closed mode when the water temperature of the cooling water is the specified value or less.

(4) In any one of the above (1) to (3), in the cooling system, the switching mode may be a mode in which at least the radiator outflow port is open.

(5) In the above (4), in the cooling system, the switching mode may be a mode in which the bypass outflow port is also open in addition to the radiator outflow port.

According to an aspect associated with the present invention, it is possible to shorten a time required for switching between a heater cut mode and a heater passing water mode.

BRIEF DESCRIPTION OF THE DRAWINGS

FIG. 11 is a development view of a valve cylinder part according to the embodiment.

DETAILED DESCRIPTION OF THE INVENTION

An embodiment of the present invention will be described below with reference to the drawings.

First Embodiment

Figure 1:
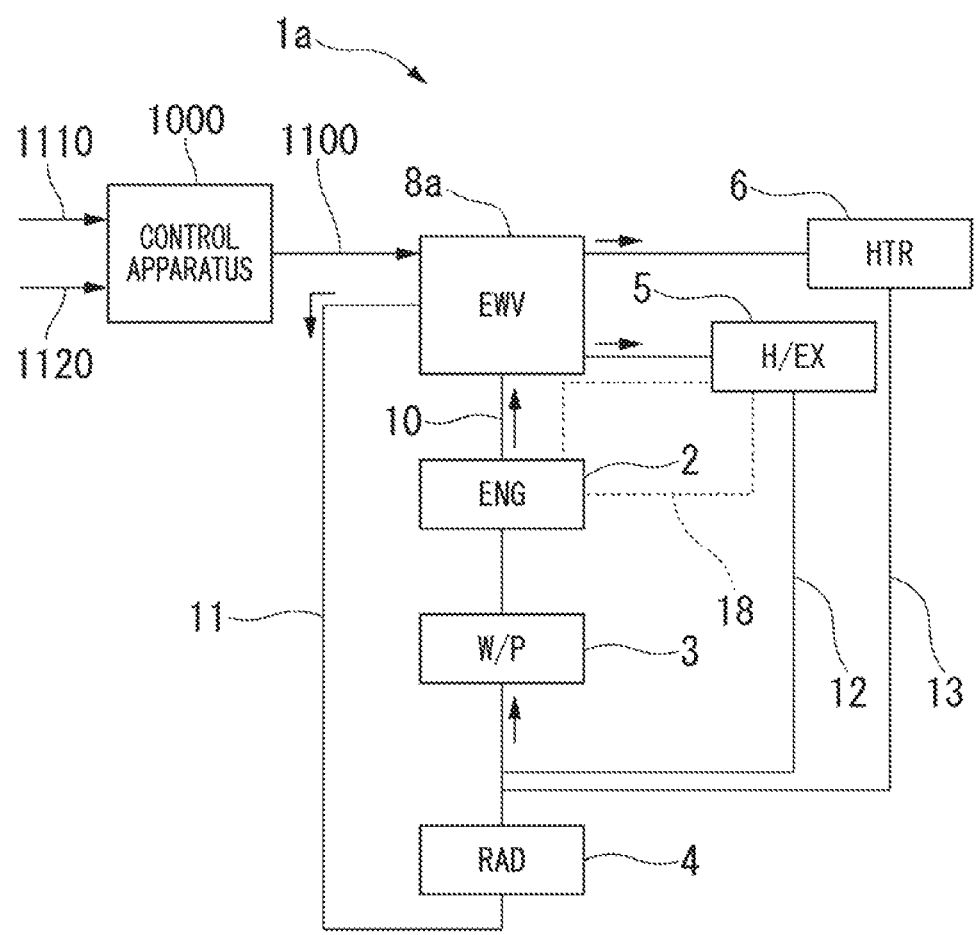
FIG. 1 is a block diagram illustrating an example of a constitution of a cooling system according to an embodiment.

A first embodiment will be described with reference to FIGS. 1 to 4.
[Cooling System]
FIG. 1 is a block diagram of a cooling system 1a.

As illustrated in FIG. 1, the cooling system 1a is installed in a vehicle including at least an engine in a vehicle driving source. Examples of the vehicle include hybrid vehicles, plug-in hybrid vehicles, and the like in addition to vehicles having only an engine.

The cooling system 1a is constituted by connecting an engine 2 (ENG), a water pump 3 (W/P), a radiator 4 (RAD), a heat exchanger 5 (H/EX), a heater core 6 (HTR), and a control valve 8a (EWV) through various flow paths 10 to 13.

The water pump 3, the engine 2, and the control valve 8a are sequentially connected in order from upstream to downstream on the main flow path 10. In the main flow path 10, an operation of the water pump 3 causes cooling water to sequentially pass through the engine 2 and the control valve 8a.

The main flow path 10 has the radiator flow path 11, a warming-up flow path 12, and an air conditioning flow path 13 connected thereto. The radiator flow path 11, the warming-up flow path 12, and the air conditioning flow path 13 connect an upstream portion of the water pump 3 in the main flow path 10 to the control valve 8a.

The control valve 8a is provided in a branching place of the radiator flow path 11, the warming-up flow path 12, and the air conditioning flow path 13.

The radiator 4 is connected to the radiator flow path 11. In the radiator flow path 11, heat exchange between cooling water and outside air is performed in the radiator 4.

The heat exchanger 5 is connected to the warming-up flow path 12. Engine oil circulates between the heat exchanger 5 and the engine 2 through an oil flow path 18. In the warming-up flow path 12, heat exchange between the cooling water and the engine oil is performed in the heat exchanger 5. That is to say, the heat exchanger 5 functions as an oil warmer when a water temperature is higher than an oil temperature and heats the engine oil. On the other hand, the heat exchanger 5 functions as an oil cooler when a water temperature is lower than an oil temperature and cools the engine oil.

The heater core 6 is connected to the air conditioning flow path 13. The heater core 6 is provided, for example, in a duct (not shown) of an air conditioning apparatus. In the air conditioning flow path 13, heat exchange between the cooling water and air conditioning air flowing in the duct is performed in the heater core 6.

A control apparatus 1000 controls the control valve 8a. A control signal 1100 is input to the control valve 8a from the control apparatus 1000. The control signal 1100 is a signal for controlling an operation of the control valve 8a.

The control valve 8a includes an inflow port into which cooling water discharged from an outlet of the main flow path 10 flows and a plurality of outflow ports (a radiator outflow port, a warming-up outflow port, and an air conditioning outflow port) through which the cooling water flowing into the inflow port is supplied to the radiator flow path 11, the warming-up flow path 12, and the air conditioning flow path 13. The radiator outflow port is an outflow port through which the cooling water is supplied to the radiator flow path 11. The warming-up outflow port is an outflow port through which the cooling water is supplied to the warming-up flow path 12. The air conditioning outflow port is an outflow port through which the cooling water is supplied to the air conditioning flow path 13.

The control valve 8a changes a degree of opening of each of the outflow ports in accordance with the control signal 1100 input from the control apparatus 1000. The degree of opening of the outflow port represents a degree of opening with respect to an upper limit (maximum opening area) of an opening area of the outflow port. The degree of opening of the outflow port may be represented by a proportion (percentage) of an opening area when the maximum opening area is set as 100%.

A cooling water temperature signal 1110 indicating a water temperature of cooling water is input to the control apparatus 1000. The water temperature of the cooling water is measured by a water temperature sensor (not shown) provided at a place at which the cooling water passes through the engine 2 on the main flow path 10. The cooling water temperature signal 1110 indicates the water temperature of the cooling water measured by the water temperature sensor.

An engine operation state signal 1120 indicating an engine operation state of the engine 2 is input to the control apparatus 1000. Examples of the engine operation state signal 1120 include a signal indicating a rotational speed of the engine 2, a signal indicating a load of the engine 2, a signal indicating a degree of throttle opening of the engine 2, and a signal indicating an intake air temperature of the engine 2.

In the cooling system 1a illustrated in FIG. 1, the cooling water passing through the engine 2 in the main flow path 10 flows into the control valve 8a and then is selectively distributed to various flow paths 11 to 13 by an operation of the control valve 8a. Thus, it is possible to realize an early temperature increase, high water temperature (optimal temperature) control, and the like, thereby improving the fuel efficiency of the vehicle.

In the cooling system 1a illustrated in FIG. 1, the main flow path 10 corresponds to a cooling flow path, the warming-up flow path 12 corresponds to a bypass flow path, the heat exchanger 5 corresponds to a device configured to perform heat exchange with cooling water, and the warming-up outflow port corresponds to a bypass outflow port.

[Control Apparatus]

Figure 2:
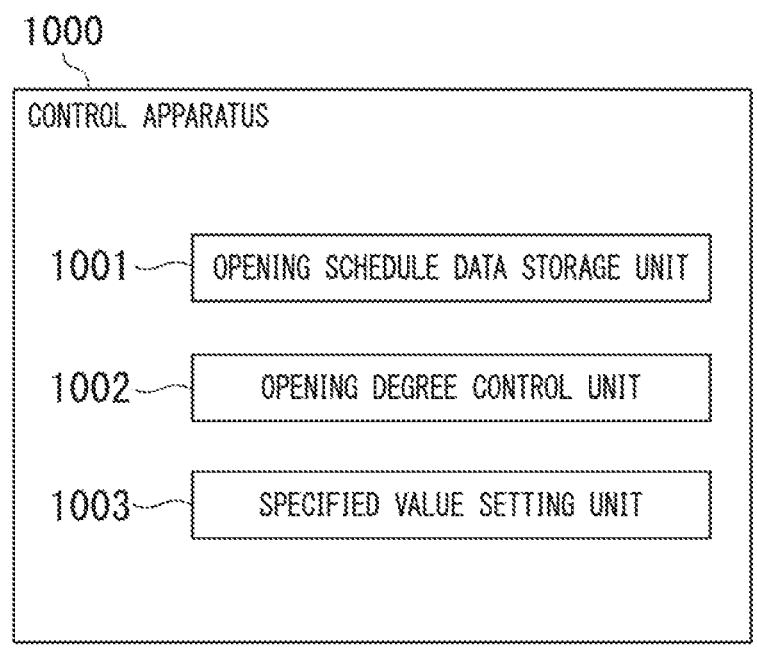
FIG. 2 is a block diagram illustrating an example of a constitution of a control apparatus according to the embodiment.
Figure 3:
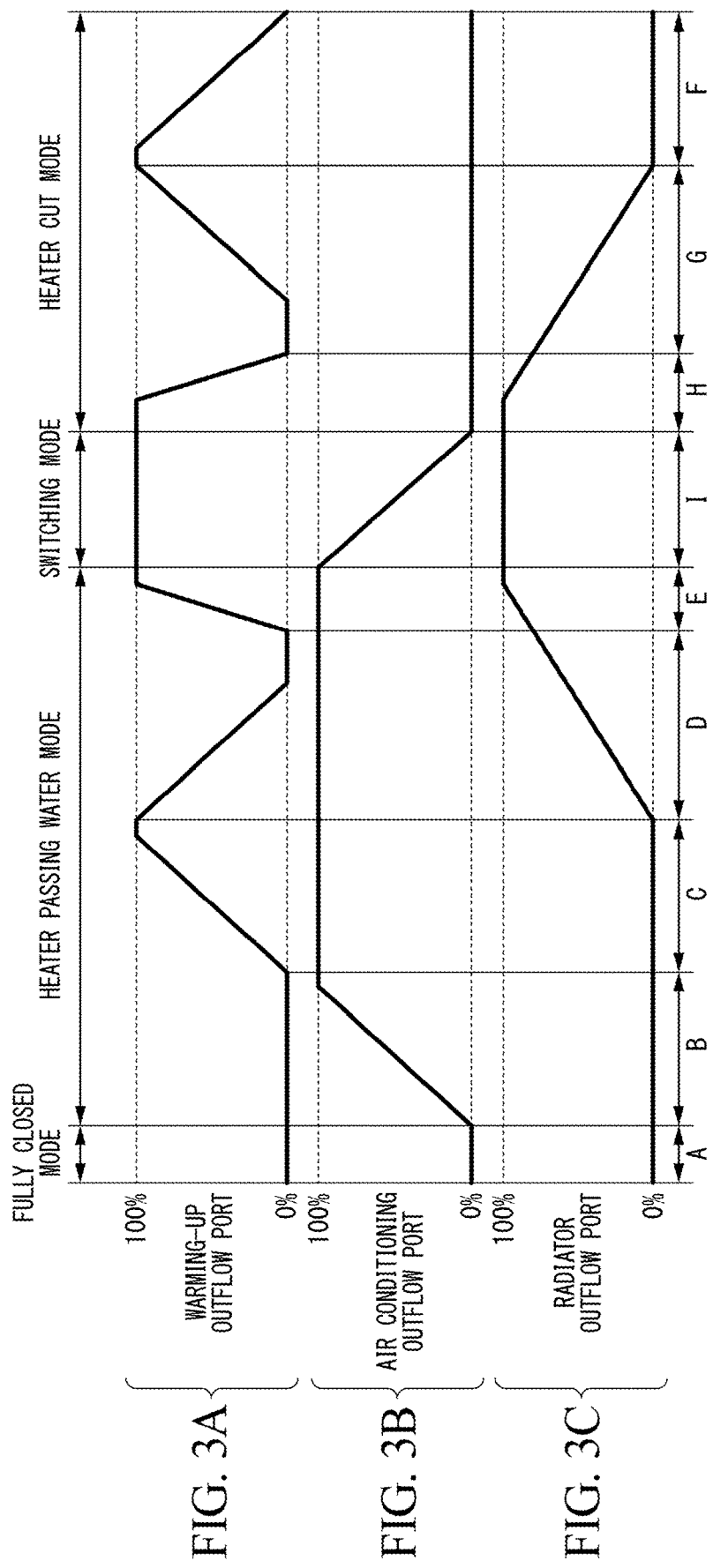
FIGS. 3A, 3B and 3C are diagrams illustrating an example of an opening schedule according to the embodiment.

FIG. 2 is a block diagram of the control apparatus 1000.

The control apparatus 1000 illustrated in FIG. 2 includes an opening schedule data storage unit 1001, an opening degree control unit 1002, and a specified value setting unit 1003.

The opening schedule data storage unit 1001 stores opening schedule data indicating opening schedules. The opening schedules are schedules of degrees of opening for the radiator outflow port, the warming-up outflow port, and the air conditioning outflow port in the control valve 8a. The opening schedules have at least a heater cut mode, a heater passing water mode, a fully closed mode, and a switching mode as modes of determining degrees of opening of the radiator outflow port, the warming-up outflow port, and the air conditioning outflow port in the control valve 8a.

The heater cut mode is a mode in which the radiator outflow port is opened in a state in which the air conditioning outflow port is closed. The heater passing water mode is a mode in which the radiator outflow port is opened in a state in which the air conditioning outflow port is opened. The fully closed mode is a mode in which all of the warming-up outflow port, the radiator outflow port, and the air conditioning outflow port are closed. The switching mode in which opening and closing of the air conditioning outflow port switched between in a state in which at least the radiator outflow port is opened.

An example of the opening schedule will be described with reference to FIGS. 3A to 3C. FIGS. 3A to 3C are diagrams illustrating an example of the opening schedule.

Horizontal axes in FIGS. 3A to 3C indicate an operation range of the control valve 8a. Vertical axes in FIGS. 3A to 3C indicate a degree of opening of outflow port (0% to 100%). FIG. 3A indicates a degree of opening of the warming-up outflow port. FIG. 3B indicates a degree of opening of the air conditioning outflow port. FIG. 3C indicates a degree of opening of the radiator outflow port.

The operation range of the control valve 8a is divided into nine regions A, B, C, D, E, F, G, H, and I. Mutual region transition between neighboring regions in FIGS. 3A to 3C is possible between the regions. Mutual region transition is possible between the region A and the region F.

The fully closed mode includes only the region A. In the region A, all of the warming-up outflow port, the air conditioning outflow port, and the radiator outflow port have a degree of opening of 0%.

The heater passing water mode includes four regions B, C, D, and E. In the region B, the warming-up outflow port and the radiator outflow port have a degree of opening which remains 0% and the air conditioning outflow port has a degree of opening which changes in a range of 0% to 100%. In the region C, the radiator outflow port has a degree of opening which remains 0%, the air conditioning outflow port has a degree of opening of 100%, and the warming-up outflow port has a degree of opening which changes in a range of 0% to 100%. In the region D, the air conditioning outflow port has a degree of opening of 100%, the warming-up outflow port has a degree of opening which changes in a range of 0% to 100%, and the radiator outflow port has a degree of opening which changes in a range of 0% to about 80%.

In the region E, the air conditioning outflow port has a degree of opening of 100%, the warming-up outflow port has a degree of opening which changes in a range of 0% to 100%, and the radiator outflow port has a degree of opening which changes in a range of about 80% to 100%.

The switching mode includes only the region I. In the region I, the warming-up outflow port and the radiator outflow port have a degree of opening of 100% and the air conditioning outflow port has a degree of opening which changes in a range of 0% to 100%.

The heater cut mode includes three regions H, G, and F. In the region H, the air conditioning outflow port has a degree of opening which remains 0%, the warming-up outflow port has a degree of opening which changes in a range of 0% to 100%, and the radiator outflow port has a degree of opening which changes in a range of about 80% to 100%. In the region G, the air conditioning outflow port has a degree of opening which remains 0%, the warming-up outflow port has a degree of opening which changes in a range of 0% to 100%, and the radiator outflow port has a degree of opening which changes in a range of 0% to about 80%. In the region F, the air conditioning outflow port and the radiator outflow port have a degree of opening which remains 0% and the warming-up outflow port has a degree of opening which changes in a range of 0% to 100%.

Description will be provided by referring again to FIG. 2.

The opening degree control unit 1002 controls degrees of opening of the radiator outflow port, the warming-up outflow port, and the air conditioning outflow port in the control valve 8a using an opening schedule indicated by opening schedule data stored in the opening schedule data storage unit 1001. The opening degree control unit 1002 generates the control signal 1100 instructing the degrees of opening of the radiator outflow port, the warming-up outflow port, and the air conditioning outflow port in the control valve 8a. The degrees of opening of the radiator outflow port, the warming-up outflow port, and the air conditioning outflow port in the control valve 8a are controlled with the control signal 1100 input from the control apparatus 1000 to the control valve 8a.

The opening degree control unit 1002 determines whether switching between the heater cut mode and the heater passing water mode will be performed via the fully closed mode or the switching mode on the basis of a specified value of a water temperature (cooling water temperature) of the cooling water and a cooling water temperature indicated by the cooling water temperature signal 1110.

The specified value setting unit 1003 sets a specified value of a cooling water temperature. The specified value of the cooling water temperature may be arbitrarily set or may be fixedly set. As an example of this embodiment, the specified value setting unit 1003 holds a plurality of candidate values as candidates for the specified value of the cooling water temperature. As the candidate values for the specified value of the cooling water temperature, for example, three candidate values, i.e., 85 □, 90 □, and 95 □, may be used. For each of the candidate values, an engine operation state to which the candidate value is applied is determined. The specified value setting unit 1003 holds data indicating the engine operation state to which each of the candidate values is applied. The specified value setting unit 1003 holds a candidate value corresponding to an engine operation state indicated by the engine operation state signal 1120 as a setting value of a specified value of a cooling water temperature. The specified value setting unit 1003 changes a candidate value set as the specified value of the cooling water temperature in accordance with a change in the engine operation state indicated by the engine operation state signal 1120.

The control apparatus 1000 may be realized by dedicated hardware or constituted of an engine control unit (ECU), a memory, and the like and may have functions realized by executing a computer program for realizing a function of each unit in FIG. 2 through the ECU.

[Method of Controlling Control Valve]

Figure 4:
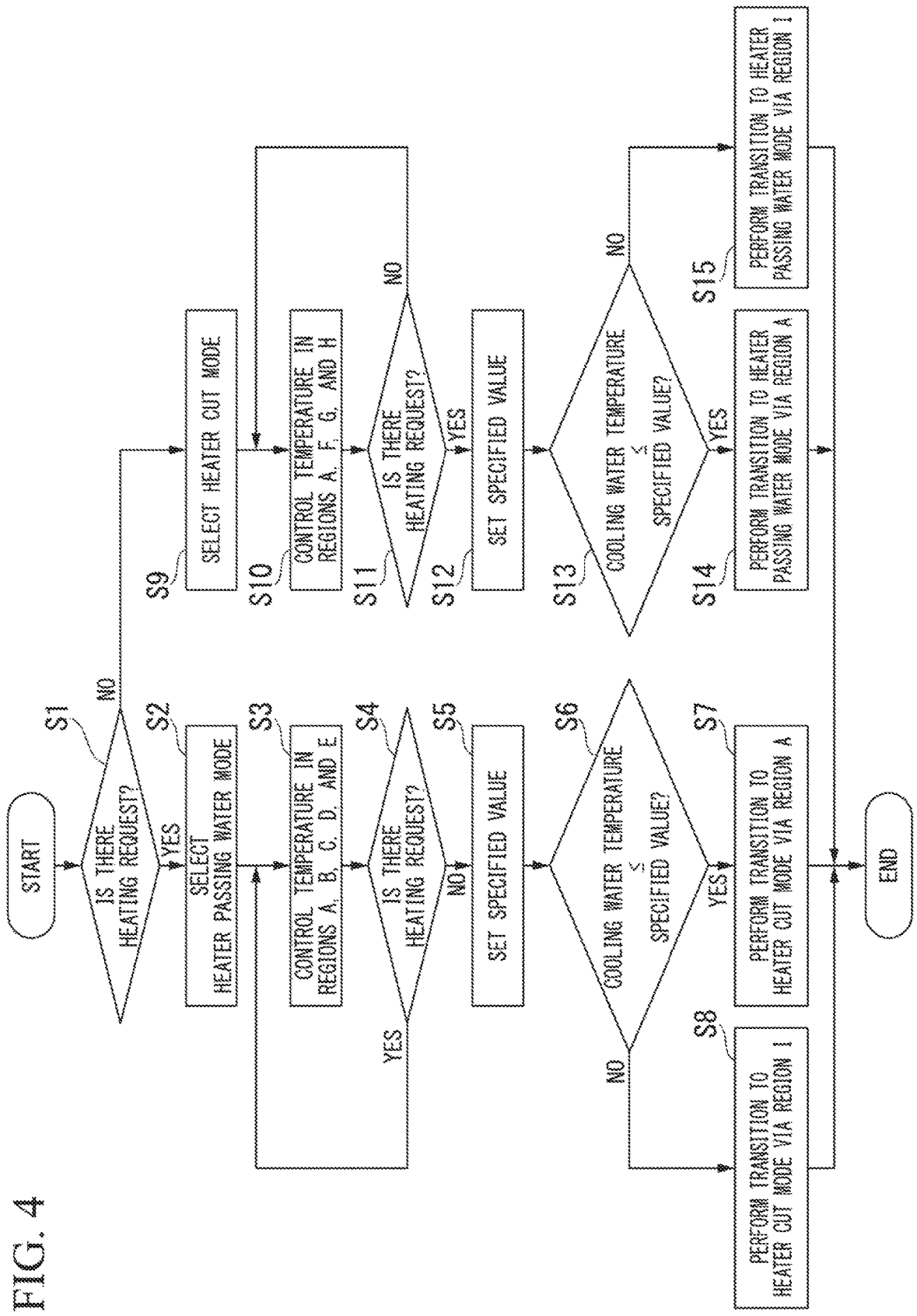
FIG. 4 is a flowchart for describing an example of a method of controlling a control valve according to the embodiment.

A method of controlling a control valve will be described with reference to FIG. 4. FIG. 4 is a flowchart for describing an example of the method of controlling the control valve. Here, the method of controlling the control valve will be described by exemplifying the opening schedule illustrated in FIGS. 3A to 3C as an opening schedule.

(Step S1) The control apparatus 1000 determines whether there is a heating request. A signal indicating the presence or absence of the heating request is input from an operation unit (not shown) of the vehicle having the cooling system 1*a* installed therein to the control apparatus 1000. When it is determined that there is a heating request, the process proceeds to a process of Step S2, and when it is determined that there is no heating request, the process proceeds to a process of Step S9.

(Step S2) The opening degree control unit 1002 selects the heater passing water mode.

(Step S3) The opening degree control unit 1002 changes degrees of opening of the radiator outflow port, the warming-up outflow port, and the air conditioning outflow port in the control valve 8*a* within a range of five regions A, B, C, D, and E of the opening schedule illustrated in FIGS. 3A to 3C and controls the cooling water temperature within a predetermined range. In the example in FIG. 4, when the heater passing water mode is selected, the heater passing water mode and the fully closed mode are used.

(Step S4) The control apparatus 1000 determines whether there is a heating request. When it is determined that there is a heating request, the process returns to the process of Step S3, and when it is determined that there is no heating request, the process proceeds to a process of Step S5.

(Step S5) The specified value setting unit 1003 sets a specified value of a cooling water temperature corresponding to an engine operation state indicated by the engine operation state signal 1120.

(Step S6) The opening degree control unit 1002 compares the specified value of the cooling water temperature with the cooling water temperature indicated by the cooling water temperature signal 1110. As a result of this comparison, when it is determined that the cooling water temperature indicated by the cooling water temperature signal 1110 is the specified value or less, the process proceeds to a process of Step S7, and when it is determined that the cooling water temperature is not the specified value or less, the process proceeds to a process of Step S8.

(Step S7) The opening degree control unit 1002 performs a transition from the region B in the heater passing water mode to the region F in the heater cut mode via the region A in the fully closed mode. Therefore, all of the warming-up outflow port, the radiator outflow port, and the air conditioning outflow port are temporarily closed during the transition from the heater passing water mode to the heater cut mode. In this way, when it is determined that the cooling water temperature indicated by the cooling water temperature signal 1110 is the specified value or less, temperature reduction of the cooling water is prevented by preventing the cooling water from passing through the radiator 4, thereby preventing a decrease in fuel efficiency of the engine 2.

(Step S8) The opening degree control unit 1002 performs a transition from the region E in the heater passing water mode to the region H in the heater cut mode via the region I in the switching mode. Therefore, the warming-up outflow port and the radiator outflow port have a degree of opening of 100% and the air conditioning outflow port has a degree of opening which changes from 100% to 0% during the transition from the heater passing water mode to the heater cut mode. In this way, when it is determined that the cooling water temperature indicated by the cooling water temperature signal 1110 exceeds a specified value, it is possible to quickly perform the transition from the heater passing water mode to the heater cut mode while preventing boiling of the cooling water by passing the cooling water through the radiator 4.

(Step S9) The opening degree control unit 1002 selects the heater cut mode.

(Step S10) The opening degree control unit 1002 changes degrees of opening of the radiator outflow port, the warming-up outflow port, and the air conditioning outflow port in the control valve 8*a* in a range of four regions A, F, G, and H of the opening schedule illustrated in FIGS. 3A to 3C and controls the cooling water temperature within a predetermined range. In the example in FIG. 4, when the heater cut mode is selected, the heater cut mode and the fully closed mode are used.

(Step S11) The control apparatus 1000 determines whether there is a heating request. When it is determined that there is a heating request, the process proceeds to a process of Step S12, and when it is determined that there is no heating request, the process returns to the process of Step S10.

(Step S12) The specified value setting unit 1003 sets a specified value of a cooling water temperature corresponding to an engine operation state indicated by the engine operation state signal 1120.

(Step S13) The opening degree control unit 1002 compares the specified value of the cooling water temperature with the cooling water temperature indicated by the cooling water temperature signal 1110. As a result of this comparison, when it is determined that the cooling water temperature indicated by the cooling water temperature signal 1110 is the specified value or less, the process proceeds to a process of Step S14, and when it is determined that the cooling water temperature is not the specified value or less, the process proceeds to a process of Step S15.

(Step S14) The opening degree control unit 1002 performs a transition from the region F in the heater cut mode to the region B in the heater passing water mode via the region A in the fully closed mode. Therefore, all of the warming-up outflow port, the radiator outflow port, and the air conditioning outflow port are temporarily closed during the transition from the heater cut mode to the heater passing water mode. In this way, when the cooling water temperature indicated by the cooling water temperature signal 1110 is the specified value or less, temperature reduction of the cooling water is prevented by preventing the cooling water from pass through the radiator 4, thereby preventing a decrease in fuel efficiency of the engine 2.

(Step S15) The opening degree control unit 1002 performs a transition from the region H in the heater cut mode to the region E in the heater passing water mode via the region I in the switching mode. Therefore, the warming-up outflow port and the radiator outflow port have a degree of opening of 100% and the air conditioning outflow port has a degree of opening which changes from 0% to 100% during the transition from the heater cut mode to the heater passing water mode. In this way, when the cooling water temperature indicated by the cooling water temperature signal 1110 exceeds a specified value, it is possible to quickly perform the transition from the heater cut mode to the heater passing water mode while preventing boiling of the cooling water by passing the cooling water through the radiator 4. Thus, when the cooling water temperature exceeds a specified value, even when a user performs an operation to request heating, the heating can be started quickly by a heater, which can contribute to the improvement of the convenience of the user.

As described above, according to this embodiment, when the cooling water temperature exceeds a specified value, the heater cut mode and the heater passing water mode are switched without passing through the fully closed mode and via the switching mode. Thus, it is possible to quickly switch between the heater cut mode and the heater passing water mode while preventing boiling of the cooling water by passing the cooling water through the radiator 4. Therefore, it is possible to shorten a time required for switching between the heater cut mode and the heater passing water mode.

In the above-described example in the opening schedule illustrated in FIGS. 3A to 3C, the warming-up outflow port and the radiator outflow port have a degree of opening of 100% in the region I in the switching mode, but the warming-up outflow port and the radiator outflow port may be opened in the switching mode and the warming-up outflow port and the radiator outflow port may have a degree of opening of less than 100%. Here, in order to prevent boiling of the cooling water, it is desirable that a degree of opening of the radiator outflow port be large in the switching mode.

In the above-described example of the opening schedule illustrated in FIGS. 3A to 3C, the switching mode is a mode of switching between opening and closing of the air conditioning outflow port in a state in which both of the radiator outflow port and the warming-up outflow port are opened, but the switching mode may be a mode of switching between opening and closing of the air conditioning outflow port in a state in which at least the radiator outflow port is opened. Therefore, in the switching mode, the warming-up outflow port may be closed.

In the cooling system 1a illustrated in FIG. 1, the warming-up flow path 12 having the heat exchanger 5 provided therein is provided as a bypass flow path, but a device configured to perform heat exchange with the cooling water in the bypass flow path is not limited to the heat exchanger 5. The device configured to perform heat exchange with the cooling water in the bypass flow path may include, for example, an EGR cooler configured to exchange heat between the cooling water and an EGR gas.

A plurality of bypass flow paths may be provided. As the plurality of bypass flow paths, for example, the warming-up flow path 12 having the heat exchanger 5 provided therein and an EGR flow path having the EGR cooler provided therein may be provided.

Second Embodiment

A second embodiment will be described with reference to FIGS. 5A, 5B, 5C and 6.

The second embodiment is another example of the method of controlling an opening schedule and a control valve. Here, a cooling system associated with the second embodiment will be described below by exemplifying the above-described cooling system 1a illustrated in FIG. 1 associated with the first embodiment.

Figure 5:
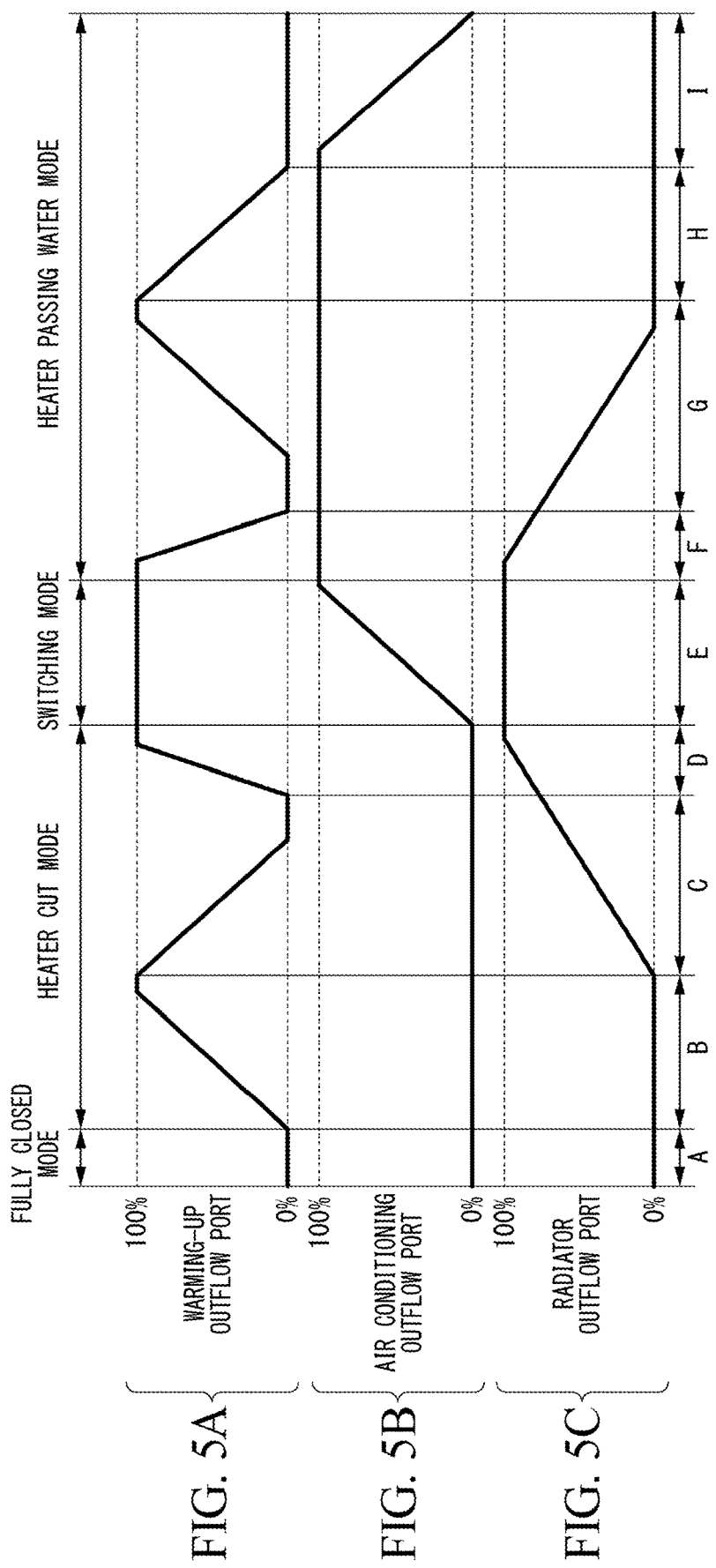
FIGS. 5A, 5B, and 5C are diagrams illustrating an example of an opening schedule according to the embodiment.

First, an example of an opening schedule associated with the second embodiment will be described with reference to FIGS. 5A to 5C. FIGS. 5A to 5C are diagrams illustrating an example of the opening schedule.

Horizontal axes in FIGS. 5A to 5C indicate an operation range of a control valve 8a. Vertical axes in FIGS. 5A to 5C indicate a degree of opening of each outflow port (0% to 100%). FIG. 5A indicates a degree of opening of a warming-up outflow port. FIG. 5B indicates a degree of opening of an air conditioning outflow port. FIG. 5C indicates a degree of opening of a radiator outflow port.

The operation range of the control valve 8a is divided into nine regions A, B, C, D, E, F, G, H, and I. Mutual region transition between neighboring regions in FIGS. 5A to 5C is possible between the regions. Mutual region transition may be possible or may not be possible between the region A and the region I.

The fully closed mode includes only the region A. In the region A, all of the warming-up outflow port, the air conditioning outflow port, and the radiator outflow port have a degree of opening of 0%.

The heater cut mode includes three regions B, C, and D. In the region B, the air conditioning outflow port and the radiator outflow port have a degree of opening which remains 0% and the warming-up outflow port has a degree of opening which changes in a range of 0% to 100%. In the region C, the air conditioning outflow port has a degree of opening which remains 0%, the warming-up outflow port has a degree of opening which changes in a range of 0% to 100%, and the radiator outflow port has a degree of opening which changes in a range of 0% to about 80%. In the region D, the air conditioning outflow port has a degree of opening which remains 0%, the warming-up outflow port has a degree of opening which changes in a range of 0% to 100%, and the radiator outflow port has a degree of opening which changes in a range of about 80% to 100%.

The switching mode includes only the region E. In the region E, the warming-up outflow port and the radiator outflow port have a degree of opening of 100% and the air conditioning outflow port has a degree of opening which changes in a range of 0% to 100%.

The heater passing water mode includes four regions F, G, H, and I. In the region F, the air conditioning outflow port has a degree of opening of 100%, the warming-up outflow port has a degree of opening which changes in a range of 0% to 100%, and the radiator outflow port has a degree of opening which changes in a range of about 80% to 100%. In the region G, the air conditioning outflow port has a degree of opening of 100%, the warming-up outflow port has a degree of opening which changes in a range of 0% to 100%, and the radiator outflow port has a degree of opening which changes in a range of 0% to about 80%. In the region H, the radiator outflow port has a degree of opening which remains 0%, the air conditioning outflow port has a degree of opening of 100%, and the warming-up outflow port has a degree of opening which changes in a range of 0% to 100%. In the region I, the warming-up outflow port and the radiator outflow port have a degree of opening which remains 0% and the air conditioning outflow port has a degree of opening which changes in a range of 0% to 100%.

[Method of Manufacturing Control Valve]

Figure 6:
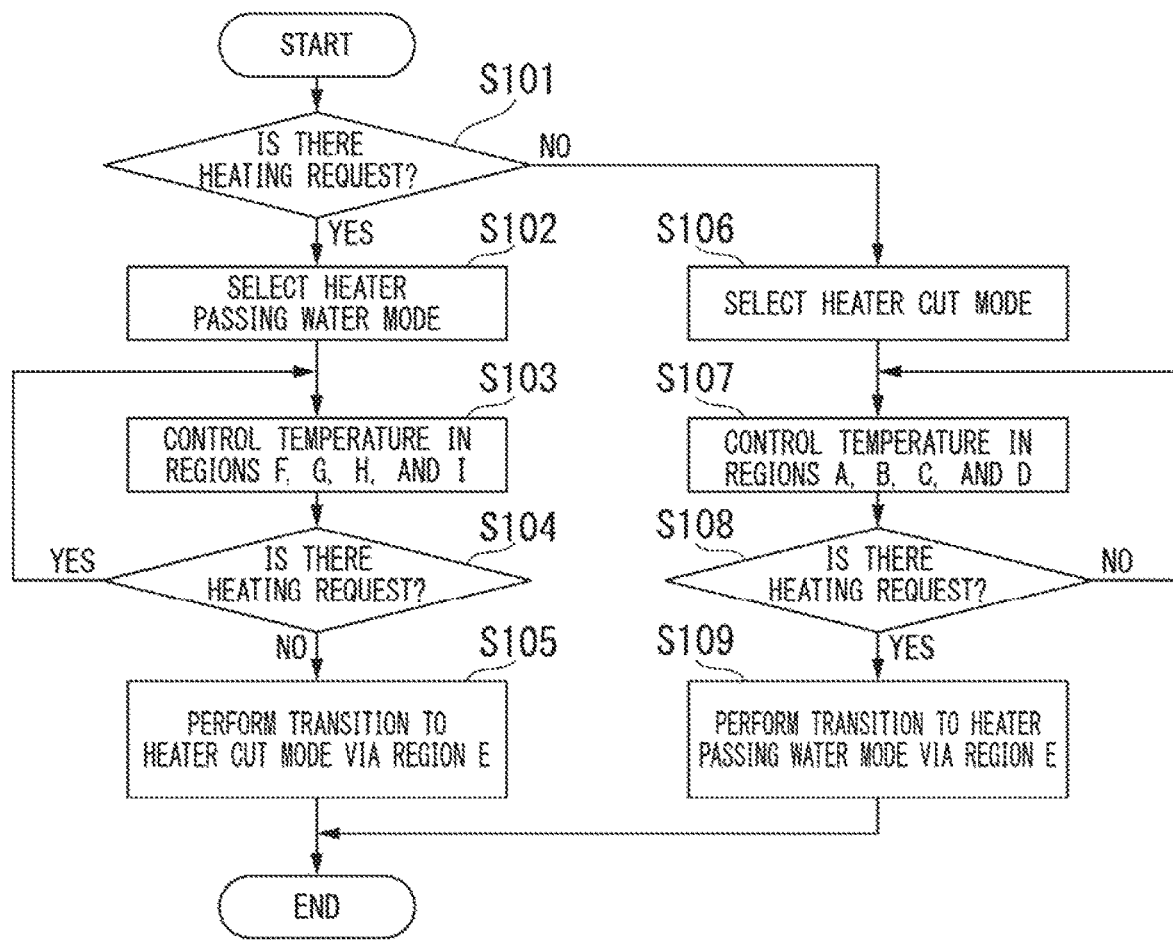
FIG. 6 is a flowchart for describing an example of a method of controlling a control valve according to the embodiment.

A method of controlling a control valve according to the second embodiment will be described with reference to FIG. 6. FIG. 6 is a flowchart for describing an example of the method of controlling the control valve. Here, the method of controlling the control valve will be described by exemplifying the opening schedule illustrated in FIGS. 5A to 5C as an opening schedule.

(Step S101) A control apparatus 1000 determines whether there is a heating request. A signal indicating the presence or absence of the heating request is input from an operation unit (not shown) of the vehicle having a cooling system 1a installed therein to the control apparatus 1000. When it is determined that there is the heating request, the process proceeds to a process of Step S102, and when it is determined that there is no heating request, the process proceeds to a process of Step S106.

(Step S102) The opening degree control unit 1002 selects the heater passing water mode.

(Step S103) The opening degree control unit 1002 changes degrees of opening of the radiator outflow port, the warming-up outflow port, and the air conditioning outflow port in the control valve 8a in a range of four regions F, G, H, and I of the opening schedule illustrated in FIGS. 5A to 5C and controls the cooling water temperature within a predetermined range.

(Step S104) The control apparatus 1000 determines whether there is a heating request. When it is determined that there is the heating request, the process returns to the process of Step S103, and when it is determined that there is no heating request, the process proceeds to a process of Step S105.

(Step S105) The opening degree control unit 1002 performs a transition from the region F in the heater passing water mode illustrated in FIGS. 5A to 5C to the region D in the heater cut mode via the region E in the switching mode. Therefore, since a mode is switched regardless of a cooling water temperature when a case in which there is a heating request is changed to a case in which there is no heating request in the second embodiment, it is possible to quickly switch from the heater passing water mode to the heater cut mode. By passing through the region E in the switching mode, the warming-up outflow port and the radiator outflow port have a degree of opening of 100% and the air conditioning outflow port has a degree of opening which changes from 100% to 0% during the transition from the heater passing water mode to the heater cut mode. Thus, it is possible to prevent the boiling of the cooling water by passing the cooling water through the radiator 4.

(Step S106) The opening degree control unit 1002 selects the heater cut mode.

(Step S107) The opening degree control unit 1002 changes degrees of opening of the radiator outflow port, the warming-up outflow port, and the air conditioning outflow port in the control valve 8a in a range of four regions A, B, C, and D of the opening schedule illustrated in FIGS. 5A to 5C and controls the cooling water temperature within a predetermined range. In the example in FIG. 6, when the heater cut mode is selected, the heater cut mode and the fully closed mode are used.

(Step S108) The control apparatus 1000 determines whether there is a heating request. When it is determined that there is the heating request, the process proceeds to a process of Step S109, and when it is determined that there is no heating request, the process returns to the process of Step S107.

(Step S109) The opening degree control unit 1002 performs a transition from the region D in the heater cut mode illustrated in FIGS. 5A to 5C to the region F in the heater passing water mode via the region E in the switching mode. Therefore, since the mode is switched regardless of the cooling water temperature when the case in which there is no heating request is changed to the case in which there is a heating request in the second embodiment, it is possible to quickly switch from the heater cut mode to the heater passing water mode. Thus, when the user performs an operation to request heating, the heating can be started quickly by the heater, which can contribute to an improvement of the convenience to the user. By passing through the region E in the switching mode, the warming-up outflow port and the radiator outflow port have a degree of opening of 100% and the air conditioning outflow port has a degree of opening which changes from 0% to 100% during the transition from the heater cut mode to the heater passing water mode. Thus, it is also possible to prevent the boiling of the cooling water by passing the cooling water through the radiator 4.

As described above, according to the second embodiment, the switching between the heater cut mode and the heater passing water mode is performed via the switching mode regardless of the cooling water temperature. Thus, since the switching between the heater cut mode and the heater passing water mode can be quickly performed, it is possible to shorten a time required for the switching between the heater cut mode and the heater passing water mode. It is also possible to prevent the boiling of the cooling water by passing the cooling water through the radiator 4.

In the opening schedule illustrated in FIGS. 5A to 5C, the regions B, C, and D in the heater cut mode are disposed near the region A in the fully closed mode. For this reason, for example, a warming-up operation has been performed in the fully closed mode immediately after the engine 2 starts and then a direct transition from the fully closed mode to the heater cut mode is possible without passing through the switching mode. Thus, the cooling water is not flowed through the radiator 4 during the transition from the fully closed mode to the heater cut mode, which can contribute to the improvement of the efficiency of a warming-up operation.

Third Embodiment

A third embodiment will be described with reference to FIGS. 7 to 11.

[Cooling System]

Figure 7:
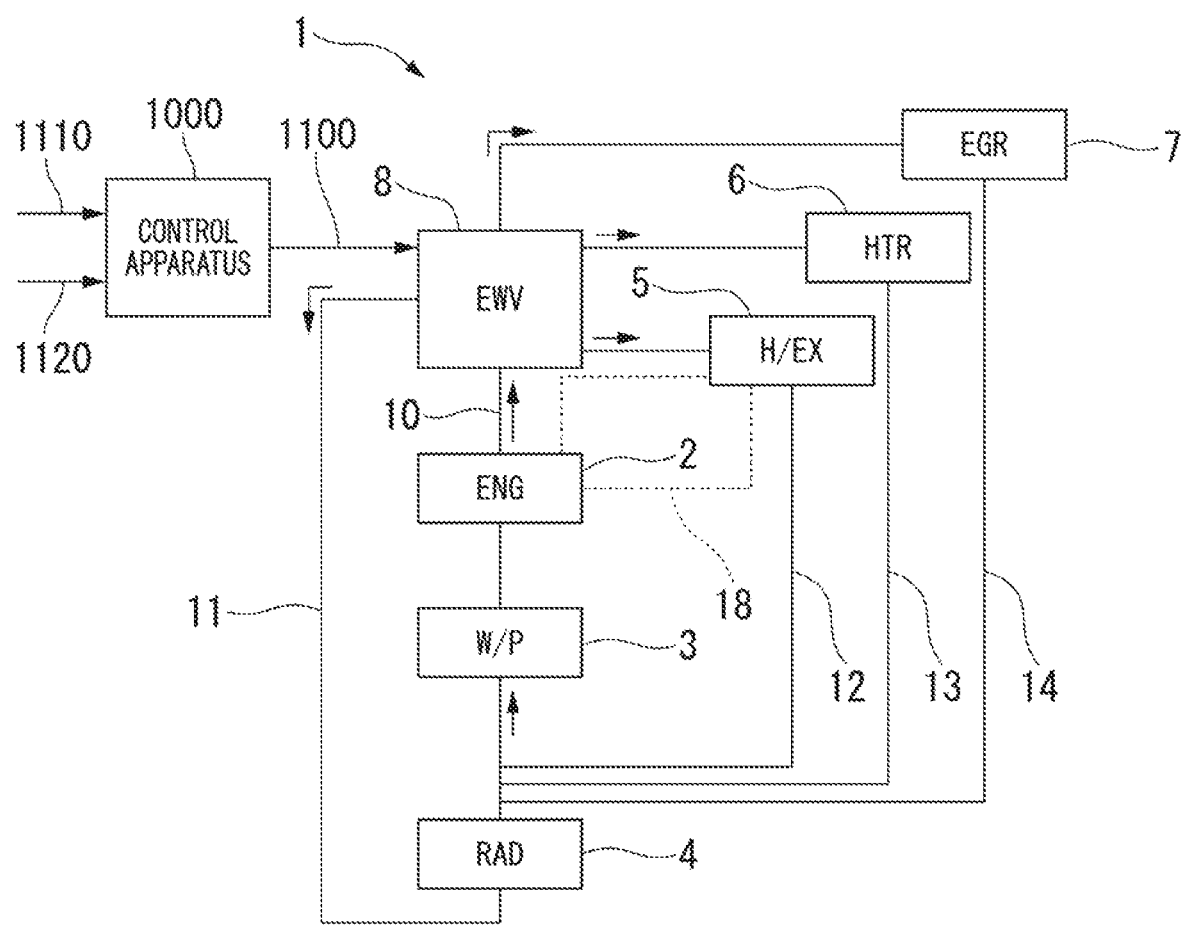
FIG. 7 is a block diagram illustrating an example of a constitution of a cooling system according to the embodiment.

FIG. 7 is a block diagram of a cooling system 1. Constituent elements in FIG. 7 corresponding to the constituent elements in FIG. 1 will be denoted by the same reference numerals and description thereof will be omitted.

As illustrated in FIG. 7, a cooling system 1 is installed in the vehicle including at least an engine in a vehicle driving source as in the cooling system 1a illustrated in FIG. 1. Examples of the vehicle include hybrid vehicles, plug-in hybrid vehicles, and the like in addition to vehicles having only an engine.

The cooling system 1 illustrated in FIG. 7 is constituted such that an EGR cooler 7 (EGR) is further connected to the cooling system 1a illustrated in FIG. 1 through an EGR flow path 14. A radiator flow path 11, a warming-up flow path 12, an air conditioning flow path 13, and the EGR flow path 14 are connected to a main flow path 10. The radiator flow path 11, the warming-up flow path 12, the air conditioning flow path 13, and the EGR flow path 14 connect an upstream portion of a water pump 3 in a main flow path 10 to a control valve 8.

The EGR cooler 7 is connected to the EGR flow path 14. In the EGR flow path 14, heat is exchanged between the cooling water and the EGR gas in the EGR cooler 7.

The control apparatus 1000 controls the control valve 8 as in the cooling system 1a illustrated in FIG. 1. A control signal 1100 is input from the control apparatus 1000 to the control valve 8.

The control valve 8 includes an inflow port into which the cooling water discharged through an outlet of the main flow path 10 flows and a plurality of outflow ports (the radiator outflow port, the warming-up outflow port, and the air conditioning outflow port) configured to supply the cooling water flowing into the inflow port to the radiator flow path 11, the warming-up flow path 12, and the air conditioning flow path 13 as in the control valve 8a illustrated in FIG. 1. The control valve 8 further includes an EGR outflow port configured to supply a part of the cooling water flowing into the inflow port to the EGR flow path 14.

The degrees of opening of the radiator outflow port, the warming-up outflow port, and the air conditioning outflow port can be changed as in the control valve 8a illustrated in FIG. 1. On the other hand, a degree of opening of the EGR outflow port is fixed to a constant degree of opening.

The control valve 8 changes the degrees of opening of the radiator outflow port, the warming-up outflow port, and the air conditioning outflow port in accordance with the control signal 1100 input from the control apparatus 1000.

In the cooling system 1 illustrated in FIG. 7, the cooling water passing through the engine 2 in the main flow path 10 flows into the control valve 8 and then is selectively distributed into various flow paths 11 to 14 in accordance with an operation of the control valve 8. Thus, it is possible to realize an early temperature increase, high water temperature (optimal temperature) control, and the like, thereby improving the fuel efficiency of the vehicle.

Also in the cooling system 1 illustrated in FIG. 7, the main flow path 10 corresponds to the cooling flow path, the warming-up flow path 12 corresponds to the bypass flow path, the heat exchanger 5 corresponds to a device configured to exchange heat with the cooling water, and the warming-up outflow port corresponds to the bypass outflow port as in the cooling system 1a illustrated in FIG. 1.

The above-described first embodiment described with reference to FIGS. 2, 3A, 3B, 3C, and 4 can be applied to a constitution of the control apparatus 1000 and the method of controlling an operation, an opening schedule, and a control valve. In the following description, description will be appropriately further provided with reference to FIGS. 2, 3A, 3B, 3C, and 4.

[Control Valve]

An example of the control valve 8 associated with the third embodiment will be described with reference to FIGS. 8 to 11.

Figure 8:
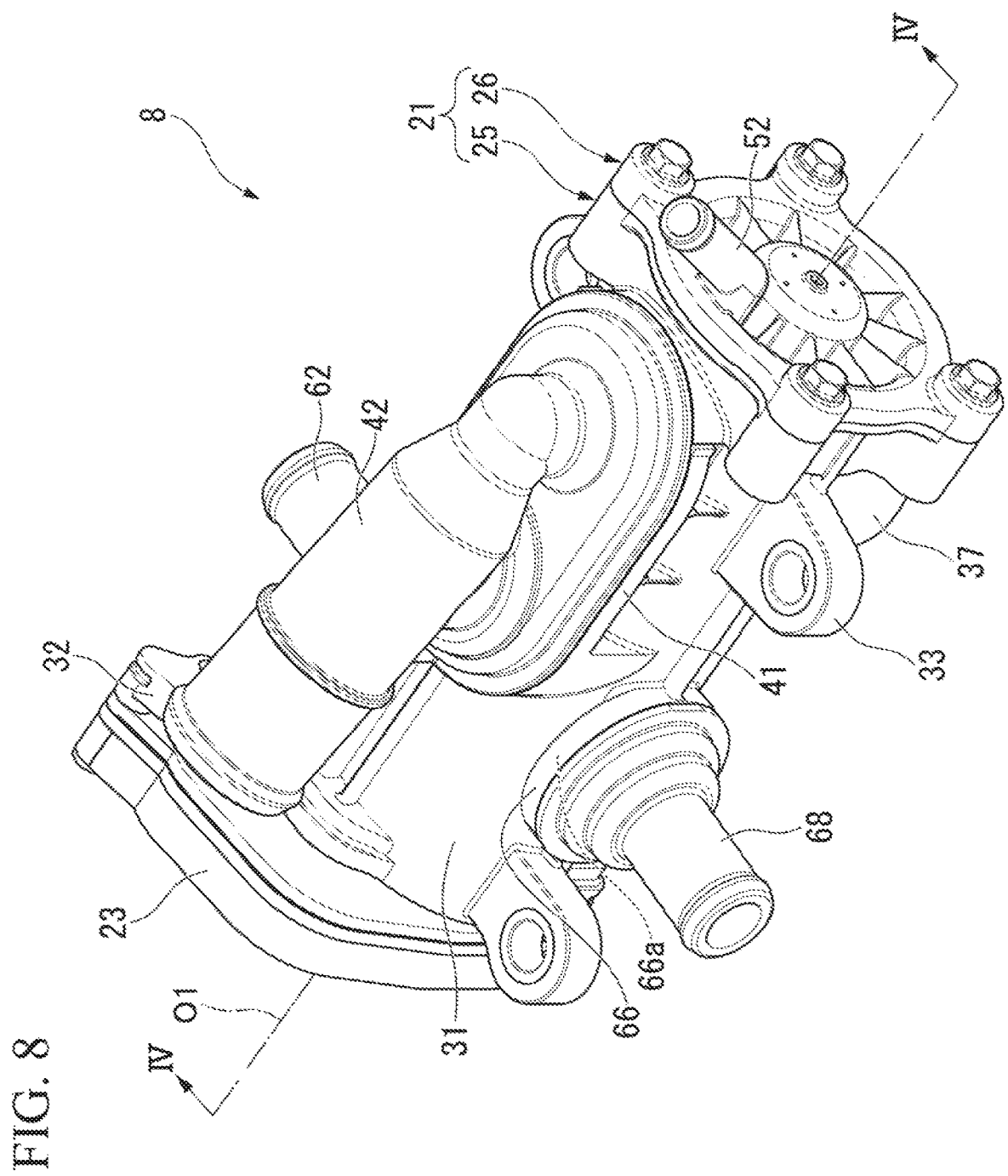
FIG. 8 is a perspective view of a control valve according to the embodiment.
Figure 9:
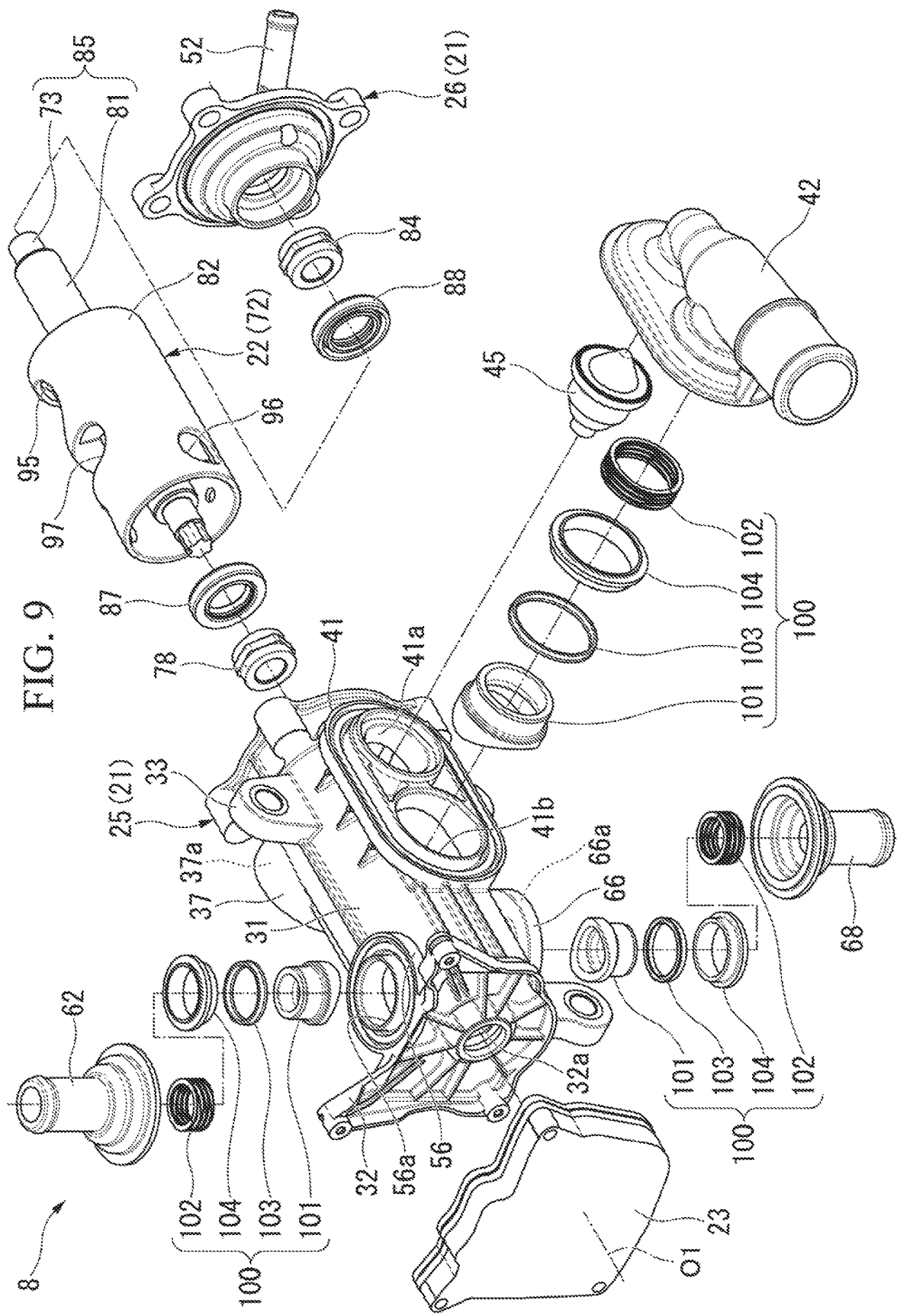
FIG. 9 is an exploded perspective view of the control valve according to the embodiment.

FIG. 8 is a perspective view of the control valve 8. FIG. 9 is an exploded perspective view of the control valve 8.

As illustrated in FIGS. 8 and 9, the control valve 8 mainly includes a casing 21, a rotor 22 (refer to FIG. 9), and a drive unit 23.

(Casing)

The casing 21 includes a bottomed tubular casing main body 25 and a lid body 26 configured to close an opening portion of the casing main body 25. In the following description, a direction along an axis O1 of the casing 21 is simply referred to as a "case axial direction." In the case axial direction, a direction toward a bottom wall portion 32 of the casing main body 25 with respect to a circumferential wall portion 31 of the casing main body 25 is referred to as a "first side" and a direction toward the lid body 26 with respect to the circumferential wall portion 31 of the casing main body 25 is referred to as a "second side." In addition, a direction which intersects the axis O1 is referred to as a "case radial direction" and a direction around the axis O1 is referred to as a "case circumferential direction."

The circumferential wall portion 31 of the casing main body 25 has a plurality of attachment pieces 33 formed thereon. Each of the attachment pieces 33 protrudes outward in the case radial direction from the circumferential wall portion 31. The control valve 8 is fixed to an inside of an engine room via, for example, each of the attachment pieces 33. A position, the number, and the like of the attachment piece 33 can be appropriately changed.

Figure 10:
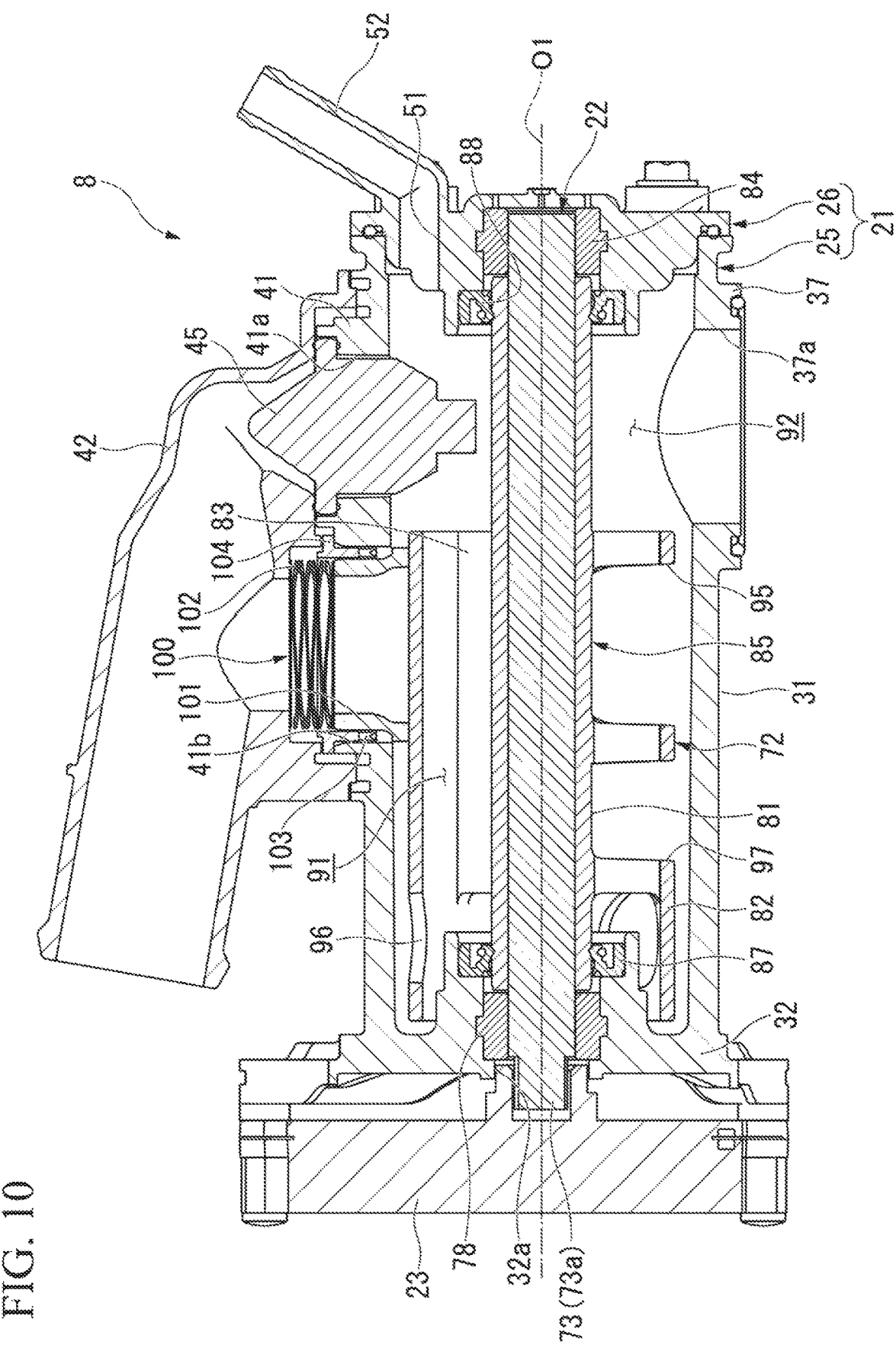
FIG. 10 is a cross-sectional view taken along line IV-IV in FIG. 8.

FIG. 10 is a cross-sectional view taken along line IV-IV in FIG. 8.

As illustrated in FIGS. 9 and 10, an inflow port 37 which swells outward in the case radial direction is formed at a position on the second side in the circumferential wall portion 31. An inflow port 37a (refer to FIG. 10) which passes in the case radial direction through the inflow port 37 is formed in the inflow port 37. The inflow port 37a communicates with the inside and outside of the casing 21. The above-described main flow path 10 (refer to FIG. 7) is connected to an opening end surface of the inflow port 37 (an outside end surface in the case radial direction).

As illustrated in FIG. 10, in the circumferential wall portion 31, a radiator port 41 which swells outward in the case radial direction is formed at a position opposite to the inflow port 37 in the case radial direction with the axis O1 sandwiched therebetween. A fail opening 41a and a radiator outflow port (second outflow port) 41b are formed side by side in the case axial direction in the radiator port 41. The fail opening 41a and the radiator outflow port 41b pass through the radiator port 41 in the case radial direction. In this embodiment, the fail opening 41a is opposite to the above-described inflow port 37a in the case radial direction. The radiator outflow port 41b is located on the first side in the case axial direction with respect to the fail opening 41a.

A radiator joint 42 is connected to the opening end surface of the radiator port 41 (the outside end surface in the case radial direction). The radiator joint 42 is connected between the radiator port 41 and an upstream end portion of the radiator flow path 11 (refer to FIG. 7). The radiator joint 42 is welded (for example, vibration-welded or the like) on the opening end surface of the radiator port 41.

A thermostat 45 is provided in the fail opening 41a. That is to say, the thermostat 45 is opposite to the above-described inflow port 37a in the case radial direction. The thermostat 45 opens and closes the fail opening 41a in accordance with a temperature of cooling water flowing in the casing 21.

The radiator port 41 may include at least the radiator outflow port 41b.

An EGR outflow port 51 is formed in a portion of the lid body 26 which is located near the radiator port 41 in the case radial direction with respect to the axis O1. The EGR outflow port 51 passes through the lid body 26 in the case axial direction.

An EGR joint 52 is formed at an opening edge of the EGR outflow port 51 in the lid body 26. The EGR joint 52 connects the EGR outflow port 51 to an upstream end portion of the above-described EGR flow path 14 (refer to FIG. 7). In this embodiment, the EGR joint 52 is integrally formed with the lid body 26. Here, the EGR joint 52 may be formed separately from the lid body 26. The EGR outflow port 51 and the EGR joint 52 may be provided in the circumferential wall portion 31 or the like.

As illustrated in FIG. 9, a warming-up port 56 which swells outward in the case radial direction is formed in a portion in the circumferential wall portion 31 which is located closer to the first side in the case axial direction than the radiator port 41. A warming-up outflow port (third outflow port) 56a passing through the warming-up port 56 in the case radial direction is formed in the warming-up port 56. A warming-up joint 62 is connected to the opening end surface of the warming-up port 56. The warming-up joint 62 connects the warming-up port 56 to an upstream end portion of the above-described warming-up flow path 12 (refer to FIG. 7). The warming-up joint 62 is welded (for example, vibration-welded or the like) on the opening end surface of the warming-up port 56.

As illustrated in FIG. 8, an air conditioning port 66 is formed in a position of the circumferential wall portion 31 which is between the radiator port 41 and the warming-up port 56 in the case axial direction and deviated by about 180° in the case circumferential direction with respect to the warming-up port 56. An air conditioning outflow port (first outflow port) 66a passing through the air conditioning port 66 in the case radial direction is formed in the air conditioning port 66. An air conditioning joint 68 is connected to the opening end surface of the air conditioning port 66. The air conditioning joint 68 connects the air conditioning port 66 to an upstream end portion of the above-described air conditioning flow path 13 (refer to FIG. 7).

The air conditioning joint 68 is welded (for example, vibration-welded or the like) on the opening end surface of the air conditioning port 66.

(Drive Unit)

As illustrated in FIG. 8, the drive unit 23 is attached to the bottom wall portion 32 of the casing main body 25. The drive unit 23 is constituted to accommodate a motor, a speed reduction mechanism, a control substrate, and the like (which are not shown). A motor installed in the drive unit 23 is constituted to be able to detect an amount of rotation using a rotation sensor such as a Hall IC.

(Rotor)

As illustrated in FIGS. 9 and 10, the rotor (valve) 22 is accommodated in the casing 21. The rotor 22 is formed in a cylindrical shape disposed coaxially with the axis O1 of the casing 21. The rotor 22 rotates around the axis O1 to open and close the above-described outflow ports (the radiator outflow port 41b, the warming-up outflow port 56a, and the air conditioning outflow port 66a).

As illustrated in FIG. 10, the rotor 22 is constituted by insert-molding an inner shaft portion 73 into the rotor main body 72.

The inner shaft portion 73 is formed of a material (for example, a metal material) having rigidity higher than that of the rotor main body 72 (for example, a resin material). The inner shaft portion 73 extends coaxially with the axis O1.

The rotor 22 may be integrally formed of, for example, a resin material or the like.

A first side end portion of the inner shaft portion 73 passes through a through hole 32a formed in the bottom wall portion 32 and passes through the bottom wall portion 32 in the case axial direction. The first side end portion of the inner shaft portion 73 is rotatably supported by a first bush 78 provided on the above-described bottom wall portion 32. A first lip seal 87 is provided in a portion in the bottom wall portion 32 which is located on the second side in the case axial direction with respect to the first bush 78.

A connecting portion 73a is formed in a portion in the inner shaft portion 73 closer to the first side in the case axial direction than the first bush 78 (a portion located further outward than the bottom wall portion 32). The connecting portion 73a is formed to have a diameter smaller than that of a portion in the inner shaft portion 73 other than the connecting portion 73a and a spline is formed on an outer circumferential surface. The connecting portion 73a is joined to the above-described drive unit 23 outside the casing 21. Thus, the power of the drive unit 23 is transmitted to the inner shaft portion 73.

The second side end portion of the inner shaft portion 73 is rotatably supported by a second bush 84 provided on the above-described lid body 26. A second lip seal 88 is provided in a portion in the lid body 26 which is located on the first side in the case axial direction with respect to the second bush 84.

The rotor main body 72 surrounds the above-described inner shaft portion 73. The rotor main body 72 mainly includes an outer shaft portion 81 configured to cover the inner shaft portion 73, a valve cylinder part 82 configured to surround the outer shaft portion 81, and a spoke portion 83 configured to join the outer shaft portion 81 to the valve cylinder part 82.

The outer shaft portion 81 surrounds the inner shaft portion 73 over the entire circumference in a state in which both end portions in the case axial direction in the inner shaft portion 73 are exposed. In this embodiment, an axis of rotation 85 of the rotor 22 is formed of the outer shaft portion 81 and the inner shaft portion 73.

The valve cylinder part 82 is disposed coaxially with the axis O1. The valve cylinder part 82 is disposed at a portion in the casing 21 closer to the first side in the case axial direction than the inflow port 37a. To be specific, the valve cylinder part 82 is disposed at a position which avoids the fail opening 41a in the case axial direction and is across the radiator outflow port 41b, the warming-up outflow port 56a, and the air conditioning outflow port 66a. A flow passage 91 through which cooling water flowing into the casing 21 through the inflow port 37a flows in the case axial direction is formed inside the valve cylinder part 82. On the other hand, a portion in the casing 21 closer to the second side in the case axial direction than the valve cylinder part 82 forms a connecting flow path 92 communicating with the flow passage 91.

In the valve cylinder part 82, a radiator communication port (second communication port) 95 passing through the valve cylinder part 82 in the case radial direction is formed at the same position in the case axial direction as the above-described radiator outflow port 41b. When the radiator communication port 95 and the radiator outflow port 41b at least partially overlap when viewed from the case radial direction, the radiator communication port 95 communicates the radiator outflow port 41b with the inside of the flow passage 91 through the radiator communication port 95.

In the valve cylinder part 82, a warming-up communication port (third communication port) 96 passing through the valve cylinder part 82 in the case radial direction is formed at the same position in the case axial direction as the above-described warming-up outflow port 56a. When the warming-up communication port 96 and the warming-up outflow port 56a at least partially overlap when viewed from the case radial direction, the warming-up communication port 96 communicates the warming-up outflow port 56a with the inside of the flow passage 91 through the warming-up communication port 96.

In the valve cylinder part 82, an air conditioning communication port (first communication port) 97 passing through the valve cylinder part 82 in the case radial direction is formed at the same position in the case axial direction as the above-described air conditioning outflow port 66a. When the air conditioning communication port 97 and the air conditioning outflow port 66a at least partially overlap when viewed from the case radial direction, the air conditioning communication port 97 communicates the air conditioning outflow port 66*a* with the inside of the flow passage 91 through the air conditioning communication port 97.

FIG. 11 is a development view of the valve cylinder part 82.

As illustrated in FIG. 11, the radiator communication port 95 has an elliptical shape in which the case circumferential direction is a long axis direction.

The warming-up communication port 96 is formed, for example, as a round hole. A plurality of warming-up communication ports 96 are formed at intervals in the case circumferential direction. In the illustrated example, in the warming-up communication ports 96, two large diameter holes are arranged in the case circumferential direction and two small diameter holes smaller than the large diameter holes are arranged in the case circumferential direction.

The air conditioning communication port 97 is formed in an elliptical shape in which the case circumferential direction is a long axis direction.

As illustrated in FIG. 9, a sealing mechanism 100 is provided in the above-described radiator port 41 (radiator outflow port 41*b*). The sealing mechanism 100 includes a sliding ring 101, a biasing member 102, a sealing ring 103, and a holder 104.

As illustrated in FIG. 10, the sliding ring 101 is inserted into the radiator outflow port 41*b*. An inner end surface of the sliding ring 101 in the case radial direction is in slidable contact with an outer circumferential surface of the valve cylinder part 82. In this embodiment, the inner end surface of the sliding ring 101 is a curved surface formed along a radius of curvature of the valve cylinder part 82.

The sealing ring 103 is externally fitted to the sliding ring 101. An outer circumferential surface of the sealing ring 103 is in slidably close contact with an inner circumferential surface of the radiator outflow port 41*b*.

The biasing member 102 is disposed between an outside end surface in the case radial direction of the sliding ring 101 and the radiator joint 42. The biasing member 102 biases the sliding ring 101 inward in the case radial direction (toward the valve cylinder part 82).

The holder 104 is disposed on an outer side of the sealing ring 103 in the case radial direction between the outer circumferential surface of the sealing ring 103 and the inner circumferential surface of the radiator outflow port 41*b*. The holder 104 restricts the movement of the sealing ring 103 outward in the case radial direction.

As illustrated in FIG. 9, a sealing mechanism 100 having the same constitution as the sealing mechanism 100 provided in the radiator outflow port 41*b* is also provided in the above-described warming-up outflow port 56*a* and air conditioning outflow port 66*a*. In this embodiment, constituent elements of the sealing mechanism 100 provided in the warming-up outflow port 56*a* and the air conditioning outflow port 66*a* will be denoted by reference numerals that are the same as those of the sealing mechanism 100 provided in the radiator outflow port 41*b* and description thereof will be omitted.

[Control Apparatus]

As illustrated in FIG. 7, the cooling system 1 in this embodiment controls an operation of the control valve 8 (rotor 22) through the control apparatus 1000 to switch between communication and cutting off with respect to the inside of the flow passage 91 and the outflow ports 41*b*, 56*a*, and 66*a*. In the following description, when it is unnecessary to distinguish the outflow ports 41*b*, 56*a*, and 66*a* and the communication ports 95 to 97, they are simply referred to as an "outflow port" and a "communication port" in some cases without denoting reference numerals.

The control signal 1100 is input from the control apparatus 1000 to the control valve 8. The control signal 1100 is a signal for controlling an operation of the control valve 8. The control valve 8 changes a degree of opening of each of the outflow ports (a communication area with a communication port in the outflow port) in accordance with the control signal 1100 input from the control apparatus 1000. The degree of opening of the outflow port indicates a degree of opening with respect to an upper limit (maximum opening area) of the opening area of the outflow port. The degree of opening of the outflow port may be represented by a proportion (percentage) of an opening area when the maximum opening area is set to 100%.

The cooling water temperature signal 1110 indicating a water temperature of the cooling water is input to the control apparatus 1000. The water temperature of the cooling water is measured by a water temperature sensor (not shown) provided at a place which is on the main flow path 10 and in which the cooling water passes through the engine 2. The cooling water temperature signal 1110 indicates the water temperature of the cooling water measured by the water temperature sensor.

The engine operation state signal 1120 indicating an engine operation state of the engine 2 is input to the control apparatus 1000. Examples of the engine operation state signal 1120 include a signal indicating a rotational speed of the engine 2, a signal indicating a load of the engine 2, a signal indicating a degree of throttle opening of the engine 2, a signal indicating an intake air temperature of the engine 2, and the like.

As illustrated in FIG. 2, the control apparatus 1000 includes an opening schedule data storage unit 1001, an opening degree control unit 1002, and a specified value setting unit 1003.

The opening schedule data storage unit 1001 stores opening schedule data indicating an opening schedule. The opening schedule is a schedule of degrees of opening of the radiator outflow port 41*b*, the warming-up outflow port 56*a*, and the air conditioning outflow port 66*a* in the control valve 8. The opening schedule has at least a heater cut mode, a heater passing water mode, a fully closed mode, and a switching mode as a mode of determining the degrees of opening of the radiator outflow port 41*b*, the warming-up outflow port 56*a*, and the air conditioning outflow port 66*a* in the control valve 8.

The heater cut mode is a mode in which the radiator outflow port 41*b* is opened in a state in which the air conditioning outflow port 66*a* is closed. The heater passing water mode is a mode in which the radiator outflow port 41*b* is opened in a state in which the air conditioning outflow port 66*a* is opened. The fully closed mode is a mode in which all of the warming-up outflow port 56*a*, the radiator outflow port 41*b*, and the air conditioning outflow port 66*a* are closed. The switching mode is a mode in which opening and closing of the air conditioning outflow port 66*a* are switched between in a state in which the radiator outflow port 41*b* and the warming-up outflow port 56*a* are opened.

FIGS. 3A to 3C illustrate an example of an opening schedule.

Horizontal axes in FIGS. 3A to 3C indicate an operation range of the control valve 8. Vertical axes in FIGS. 3A to 3C indicate a degree of opening (0% to 100%) of each outflow port. FIG. 3A indicates a degree of opening of the warming-up outflow port 56*a*.

FIG. 3B indicates a degree of opening of the air conditioning outflow port 66a. FIG. 3C indicates a degree of opening of the radiator outflow port 41b.

The operation range of the control valve 8 is divided into nine regions A, B, C, D, E, F, G, H, and I. Mutual region transition is possible between neighboring regions in FIGS. 3A to 3C. The rotor 22 in this embodiment is configured to be rotatable by 360° in both directions, i.e., a forward rotation direction and a reverse rotation direction, by detecting an amount of rotation of the motor using a rotation sensor.

The fully closed mode includes only the region A. In the region A, all of the warming-up outflow port 56a, the air conditioning outflow port 66a, and the radiator outflow port 41b have a degree of opening of 0%.

The heater passing water mode has four regions B, C, D, and E. In the region B, the warming-up outflow port 56a and the radiator outflow port 41b have a degree of opening which remains 0% and the air conditioning outflow port 66a has a degree of opening which changes in a range of 0% to 100%. In the region C, the radiator outflow port 41b has a degree of opening which remains 0%, the air conditioning outflow port 66a has a degree of opening of 100%, and the warming-up outflow port 56a has a degree of opening which changes in a range of 0% to 100%. In the region D, the air conditioning outflow port 66a has a degree of opening of 100%, the warming-up outflow port 56a has a degree of opening which changes in a range of 100% to 0%, and the radiator outflow port 41b has a degree of opening which changes in a range of 0% to about 80%. In the region E, the air conditioning outflow port 66a has a degree of opening of 100%, the warming-up outflow port 56a has a degree of opening which changes in a range of 0% to 100%, and the radiator outflow port 41b has a degree of opening which changes in a range of about 80% to 100%.

The switching mode includes only the region I. In the region I, the warming-up outflow port 56a and the radiator outflow port 41b have a degree of opening of 100% and the air conditioning outflow port 66a has a degree of opening which changes in a range of 100% to 0%.

The heater cut mode includes three regions H, G, and F. In the region H, the air conditioning outflow port 66a has a degree of opening which remains 0%, the warming-up outflow port 56a has a degree of opening which changes in a range of 100% to 0%, and the radiator outflow port 41b has a degree of opening which changes in a range of 100% to about 80%. In the region G, the air conditioning outflow port 66a has a degree of opening which remains 0%, the warming-up outflow port 56a has a degree of opening which changes in a range of 0% to 100%, and the radiator outflow port 41b has a degree of opening which changes in a range of about 80% to 0%. In the region F, the air conditioning outflow port 66a and the radiator outflow port 41b have a degree of opening which remains 0% and the warming-up outflow port 56a has a degree of opening which changes in a range of 100% to 0%.

Referring again to FIG. 2, description will be provided.

The opening degree control unit 1002 controls degrees of opening of the radiator outflow port 41b, the warming-up outflow port 56a, and the air conditioning outflow port 66a in the control valve 8 using an opening schedule indicated by opening schedule data stored in the opening schedule data storage unit 1001. The opening degree control unit 1002 generates the control signal 1100 instructing the degrees of opening of the radiator outflow port 41b, the warming-up outflow port 56a, and the air conditioning outflow port 66a in the control valve 8. The degrees of opening of the radiator outflow port 41b, the warming-up outflow port 56a, and the air conditioning outflow port 66a in the control valve 8 controlled with the control signal 1100 input from the control apparatus 1000 to the control valve 8.

The opening degree control unit 1002 determines whether to perform the switching between the heater cut mode (second position) and the heater passing water mode (first position) via the fully closed mode (fourth position) or the switching mode (third position) on the basis of a specified value of the water temperature (cooling water temperature) of the cooling water and the cooling water temperature indicated by the cooling water temperature signal 1110.

The specified value setting unit 1003 sets a specified value of the cooling water temperature. The specified value of the cooling water temperature may be arbitrarily set or may be fixedly set. As an example of this embodiment, the specified value setting unit 1003 holds a plurality of candidate values as candidates for the specified value of the cooling water temperature. For example, three candidate values such as 85° C., 90° C., and 95° C. are used as the candidate values for the specified value of the cooling water temperature. For each of the candidate values, an engine operation state to which the candidate value is applied is determined. The specified value setting unit 1003 holds data indicating the engine operation state to which each of the candidate values is applied. The specified value setting unit 1003 holds a candidate value corresponding to the engine operation state indicated by the engine operation state signal 1120 as a setting value of the specified value of the cooling water temperature. The specified value setting unit 1003 changes the candidate value to be set to the specified value of the cooling water temperature in accordance with a change in the engine operation state indicated by the engine operation state signal 1120.

The control apparatus 1000 may be realized by dedicated hardware or may be constituted of an ECU, a memory, and the like and may realize functions of units in FIG. 2 with a computer program for realizing the functions executed by the ECU.

In this way, as illustrated in FIGS. 11 and 3A-3C, in the control valve 8 in this embodiment, positions of each of the outflow ports and a communication port corresponding to the outflow port are set to satisfy the above-described opening schedule. In this case, for example, in the switching mode of the region I, each communication port of the valve cylinder part 82 is set so that the radiator outflow port 41b communicates with the flow passage 91, the warming-up outflow port 56a communicates with the flow passage 91, and the air conditioning outflow port 66a communicates with the flow passage 91. Particularly, in this embodiment, in the switching mode, a degree of opening of the air conditioning outflow port 66a changes due to the rotation of the rotor 22, whereas the radiator outflow port 41b and the entire radiator communication port 95 overlap and the warming-up outflow port 56a and the entire warming-up communication port 96 overlap (a degree of opening is 100%).

Here, in the switching mode, the radiator outflow port 41b and the warming-up outflow port 56a may communicate at least the radiator outflow port 41b with the flow passage 91. In the switching mode, the radiator outflow port 41b and the warming-up outflow port 56a are not required to be in a fully opened state and at least a part thereof may communicate with the flow passage 91.

In the control valve 8 in this embodiment, in the fully closed mode of the region A, each communication port of the valve cylinder part 82 is set so that the communication of all of the outflow ports of the radiator outflow port 41*b*, the warming-up outflow port 56*a*, and the air conditioning outflow port 66*a* with the flow passage 91 is blocked.

[Method of Operating Control Valve]

A method of operating the above-described control valve 8 will be described below.

As illustrated in FIG. 7, in the main flow path 10, cooling water delivered from the water pump 3 performs heat exchange in the engine 2 and flows toward the control valve 8. As illustrated in FIG. 10, the cooling water which has passed through the engine 2 in the main flow path 10 flows into the connecting flow path 92 in the casing 21 through the inflow port 37*a*.

Partial cooling water of the cooling water which has flowed into the connecting flow path 92 flows into the EGR outflow port 51. The cooling water which has flowed into the EGR outflow port 51 is supplied into the EGR flow path 14 through the EGR joint 52. The cooling water supplied into the EGR flow path 14 performs heat exchange between the cooling water and an EGR gas in the EGR cooler 7 and is returned to the main flow path 10.

On the other hand, cooling water which has not flowed into the EGR outflow port 51 of the cooling water which has flowed into the connecting flow path 92 flows from the second side in the case axial direction into the flow passage 91. The cooling water which has flowed into the flow passage 91 is distributed into each of the outflow ports in the process of flowing the cooling water in the flow passage 91 in the case axial direction. That is to say, the cooling water flowing into the flow passage 91 is distributed into the flow paths 11 to 13 through outflow ports communicating with the communication port among the outflow ports.

In the control valve 8, in order to switch opening schedules of the outflow ports and the communication port, the rotor 22 rotates around the axis O1. Thus, the communication and the cutting off of the outflow ports and the communication port can be switched in accordance with a rotational position of the rotor 22.

[Method of Controlling Control Valve]

A method of controlling the control valve 8 will be described with reference to FIG. 4. Here, the method of controlling the control valve 8 will be described by exemplifying the opening schedule illustrated in FIGS. 3A to 3C as an opening schedule.

(Step S1) The control apparatus 1000 determines whether there is a heating request. A signal indicating the presence or absence of the heating request is input from an operation unit (not shown) of the vehicle having the cooling system 1 installed therein to the control apparatus 1000. When it is determined that there is the heating request, the process proceeds to a process of Step S2, and when it is determined that there is no heating request, the process proceeds to a process of Step S9.

(Step S2) The opening degree control unit 1002 selects the heater passing water mode.

(Step S3) The opening degree control unit 1002 changes degrees of opening of the radiator outflow port 41*b*, the warming-up outflow port 56*a*, and the air conditioning outflow port 66*a* in the control valve 8 in a range of five regions A, B, C, D, and E of the opening schedule illustrated in FIGS. 3A to 3C and controls the cooling water temperature within a predetermined range. In the example in FIG. 4, when the heater passing water mode is selected, the heater passing water mode and the fully closed mode are used.

(Step S4) The control apparatus 1000 determines whether there is a heating request. When it is determined that there is the heating request, the process returns to the process of Step S3, and when it is determined that there is no heating request, the process proceeds to a process of Step S5.

(Step S5) The specified value setting unit 1003 sets a specified value of a cooling water temperature corresponding to an engine operation state indicated by the engine operation state signal 1120.

(Step S6) The opening degree control unit 1002 compares the specified value of the cooling water temperature with the cooling water temperature indicated by the cooling water temperature signal 1110. As a result of this comparison, when the cooling water temperature indicated by the cooling water temperature signal 1110 is the specified value or less, the process proceeds to a process of Step S7, and when the cooling water temperature is not the specified value or less, the process proceeds to a process of Step S8.

(Step S7) The opening degree control unit 1002 performs a transition from the region B in the heater passing water mode to the region F in the heater cut mode via the region A in the fully closed mode. When a transition is performed via the region A, for example, when the rotor 22 rotates in a forward rotation direction, the radiator communication port 95 is not joined to pass through the radiator outflow port 41*b*, the warming-up communication port 96 is not joined to pass through the warming-up outflow port 56*a*, and the communication between the air conditioning outflow port 66*a* and the air conditioning communication port 97 is cut off. Therefore, all of the warming-up outflow port 56*a*, the radiator outflow port 41*b*, and the air conditioning outflow port 66*a* are temporarily closed during the transition from the heater passing water mode to the heater cut mode. In this way, when the cooling water temperature indicated by the cooling water temperature signal 1110 is the specified value or less, temperature reduction of the cooling water is prevented by preventing the cooling water from passing through the radiator 4, thereby preventing a decrease in fuel efficiency of the engine 2.

(Step S8) The opening degree control unit 1002 performs a transition from the region E in the heater passing water mode to the region H in the heater cut mode via the region I in the switching mode. When a transition is performed via the region I, for example, when the rotor 22 rotates in a reverse rotation direction, the communication between the air conditioning outflow port 66*a* and the air conditioning communication port 97 is cut off in a state in which the radiator outflow port 41*b* communicates with the flow passage 91 through the radiator communication port 95 and the warming-up outflow port 56*a* communicates with the flow passage 91 through the warming-up communication port 96. Therefore, the warming-up outflow port 56*a* and the radiator outflow port 41*b* have a degree of opening of 100% and the air conditioning outflow port 66*a* has a degree of opening which changes from 100% to 0% during the transition from the heater passing water mode to the heater cut mode. In this way, when the cooling water temperature indicated by the cooling water temperature signal 1110 exceeds a specified value, it is possible to quickly perform the transition from the heater passing water mode to the heater cut mode while preventing the boiling of the cooling water by passing the cooling water through the radiator 4.

(Step S9) The opening degree control unit 1002 selects the heater cut mode.

(Step S10) The opening degree control unit 1002 changes degrees of opening of the radiator outflow port 41*b*, the warming-up outflow port 56*a*, and the air conditioning outflow port 66*a* in the control valve 8 in a range of four regions A, F, G, and H of the opening schedule illustrated in FIGS. 3A to 3C and controls the cooling water temperature within a predetermined range.

In the example in FIG. 4, when the heater cut mode is selected, the heater cut mode and the fully closed mode are used.

(Step S11) The control apparatus 1000 determines whether there is a heating request. When it is determined that there is the heating request, the process proceeds to a process of Step S12, and when it is determined that there is no heating request, the process returns to the process of Step S10.

(Step S12) The specified value setting unit 1003 sets a specified value of a cooling water temperature corresponding to an engine operation state indicated by the engine operation state signal 1120.

(Step S13) The opening degree control unit 1002 compares the specified value of the cooling water temperature with the cooling water temperature indicated by the cooling water temperature signal 1110. As a result of this comparison, when the cooling water temperature indicated by the cooling water temperature signal 1110 is the specified value or less, the process proceeds to a process of Step S14, and when the cooling water temperature is not the specified value or less, the process proceeds to a process of Step S15.

(Step S14) The opening degree control unit 1002 performs a transition from the region F in the heater cut mode to the region B in the heater passing water mode via the region A in the fully closed mode. Therefore, all of the warming-up outflow port 56a, the radiator outflow port 41b, and the air conditioning outflow port 66a are temporarily closed during the transition from the heater cut mode to the heater passing water mode. In this way, when the cooling water temperature indicated by the cooling water temperature signal 1110 is the specified value or less, temperature reduction of the cooling water is prevented by preventing the cooling water from passing through the radiator 4, thereby preventing a decrease in fuel efficiency of the engine 2.

(Step S15) The opening degree control unit 1002 performs a transition from the region H in the heater cut mode to the region E in the heater passing water mode via the region I in the switching mode. Therefore, the warming-up outflow port 56a and the radiator outflow port 41b have a degree of opening of 100% and the air conditioning outflow port 66a has a degree of opening which changes from 0% to 100% during the transition from the heater cut mode to the heater passing water mode. In this way, when the cooling water temperature indicated by the cooling water temperature signal 1110 exceeds a specified value, it is possible to quickly perform the transition from the heater cut mode to the heater passing water mode while preventing the boiling of the cooling water by passing the cooling water through the radiator 4. Thus, when the cooling water temperature exceeds the specified value, heating can be started quickly by the heater core even when the user performs an operation to request heating, which can contribute to the improvement of the convenience of the user.

In this way, in this embodiment, a constitution in which the communication ports 95 and 97 of the valve cylinder part 82 are set so that the radiator outflow port 41b communicates with the flow passage 91 and the air conditioning outflow port 66a communicates with the flow passage 91 in the switching mode is provided.

With this constitution, when the transition between the heater passing water mode and the heater cut mode is performed, the cooling water is allowed to flow through the radiator 4. Thus, when the cooling water temperature is higher than a specified value, it is possible to quickly switch between the heater passing water mode and the heater cut mode while preventing the boiling of the cooling water. Thus, it is possible to shorten a time required for the switching between the heater cut mode and the heater passing water mode.

In this embodiment, a constitution in which the communication port 95 to 97 of the valve cylinder part 82 are set so that the communication of all outflow ports of the radiator outflow port 41b, the warming-up outflow port 56a, and the air conditioning outflow port 66a with the flow passage 91 is cut off in the fully closed mode is provided.

With this constitution, when the transition between the heater passing water mode and the heater cut mode is performed, it is possible to prevent the cooling water from flowing through the radiator 4. Thus, since it is possible to prevent temperature reduction of the cooling water when the cooling water temperature is a specified value or less, it is easy to maintain high water temperature control of the engine 2 and it is possible to minimize a decrease in fuel efficiency of the engine 2.

Moreover, in this embodiment, when the transition between the heater passing water mode and the heater cut mode is performed, it is possible to select the fully closed mode and the switching mode by switching between forward and reverse rotations of the rotor 22. Thus, it is possible to switch between the heater passing water mode and the heater cut mode by passing only any of the fully closed mode and the switching mode.

In this embodiment, a constitution in which the communication ports 96 and 97 of the valve cylinder part 82 are set so that the warming-up outflow port 56a communicates with the flow passage 91 and the air conditioning outflow port 66a communicates with the flow passage 91 in the switching mode is provided.

With this constitution, the warming-up outflow port 56a communicates with the flow passage 91 in addition to the radiator outflow port 41b. For this reason, it is possible to reduce a temperature of the cooling water using the heat exchanger 5 as an oil warmer in the switching mode. Thus, it is possible to shorten a time required for the switching between the heater cut mode and the heater passing water mode.

In this embodiment, the radiator outflow port 41b and the warming-up outflow port 56a are constituted to be in a fully opened state in the switching mode.

With this constitution, it is possible to flow a large amount of cooling water through the radiator 4 and the heat exchanger 5. Thus, it is possible to quickly reduce the temperature of the cooling water.

Although a constitution in which the control valve 8 is installed in the cooling system 1 of the engine 2 has been described in the above-described embodiment, the present invention is not limited thereto and this constitution may be installed in other systems.

Although a constitution in which the cooling water which has flowed into the control valve 8 is distributed into the radiator flow path 11, the warming-up flow path 12, the air conditioning flow path 13, and the EGR flow path 14 has been described in the above-described embodiment, the present invention is not limited thereto. The control valve 8 may be configured to distribute the cooling water flowing into the control valve 8 into at least the radiator flow path 11 and the warming-up flow path 12.

Although a case in which the radiator outflow port 41b and the air conditioning outflow port 66a are formed as long holes has been described in the above-describe embodiment, the present invention is not limited thereto. That is to say, in the switching mode, when the radiator outflow port 41b communicates with the flow passage 91 and the air conditioning outflow port 66a communicates with the flow passage 91, a shape, a layout, and the like of each of the outflow ports can be appropriately changed.

Although, for example, a constitution in which the inflow port, the communication ports, and the outflow ports pass through the valve cylinder part 82 and the casing 21 in the case radial direction has been described in the above-described embodiment, the present invention is not limited thereto. For example, the communication ports and the outflow ports may pass through the valve cylinder part 82 and the casing 21 in the case axial direction.

Although a constitution in which the valve (rotor 22) associated with the present invention rotates around the axis O1 has been described in the above-described embodiment, the present invention is not limited thereto. For example, the valve may be configured to move in the case axial direction.

Although a case in which the rotor 22 (valve cylinder part 82) and the casing 21 (circumferential wall portion 31) are formed in the cylindrical shape (to have a uniform across the entire case axial direction) has been described in the above-described embodiment, the present invention is not limited to this constitution. That is to say, an outer diameter of the valve cylinder part 82 and an inner diameter of the circumferential wall portion 31 may be changed as long as the valve cylinder part 82 is configured to be rotatable in the circumferential wall portion 31.

In this case, the valve cylinder part 82 and the circumferential wall portion 31 can adopt, for example, various shapes a spherical shape (a shape in which a diameter thereof decreases from a center portion in the case axial direction toward both end portions thereof), a straddle type (a shape in which a diameter thereof increases from a center portion in the case axial direction toward both end portions thereof), a shape having a tertiary curved surface such as a shape in which a plurality of spherical shapes and straddle types are continuous in the case axial direction, a tapered shape (a shape in which a diameter thereof gradually changes from the first side in the case axial direction to the second side thereof), and a stair shape (a shape in which a diameter thereof gradually changes from the first side in the case axial direction to the second side thereof) can be adopted.

Although the valve cylinder part 82 having the opening portions on both sides in the axial direction exemplified as the rotor 22 associated with the present invention in the above-described embodiment, the present invention is not limited to only this constitution. The rotor 22 may be a hollow rotating body in which at least one side in the case axial direction is closed as long as the rotor 22 is configured to be rotatable in the casing 21 and to have a valve hole formed to allow communication between the inside and the outside. In this case, a spherical shape, a hemispherical shape, and the like can be adopted for the hollow rotating body.

The method of controlling the opening schedule and the control valve in the second embodiment may be adopted for the control valve 8 associated with the above-described third embodiment. For example, when the opening schedule illustrated in FIGS. 5A to 5C is applied to the control valve 8 associated with the third embodiment, in the control valve 8, the positions of the outflow ports and the communication port corresponding to each of the outflow ports may be set to satisfy the opening schedule illustrated in FIGS. 5A to 5C.

While the embodiments of the present invention have been described in detail above with reference to the drawings, the specific constitution is not limited to the embodiments and design changes and the like are also included without departing from the gist of the present invention. The present invention is not limited by the foregoing description, but only by the scope of the appended claims.

What is claimed is:

1. A cooling system comprising:
   a cooling flow path through which cooling water flows to cool an engine;
   a plurality of branch flow paths through which the cooling water discharged through an outlet of the cooling flow path is returned to an inlet of the cooling flow path and which have a radiator flow path including a radiator configured to radiate heat of the cooling water, an air conditioning flow path including an air conditioning heater, and a bypass flow path including a device configured to exchange heat with the cooling water;
   a control valve provided at a branching place in the plurality of branch flow paths; and
   a control apparatus configured to control the control valve,
   wherein
   the control valve includes an inflow port into which the cooling water discharged through the outlet of the cooling flow path flows and a plurality of outflow ports through which the cooling water flowing into the inflow port is supplied to the plurality of branch flow paths and changes a degree of opening of each of the plurality of outflow ports in accordance with control performed by the control apparatus,
   the control apparatus includes: an opening schedule data storage unit configured to store opening schedule data indicating an opening schedule of the degree of opening of each of the plurality of outflow ports of the control valve including at least a heater cut mode in which a radiator outflow port through which the cooling water is supplied to the radiator flow path is opened in a state in which an air conditioning outflow port through which the cooling water is supplied to the air conditioning flow path is closed, a heater passing water mode in which the radiator outflow port is opened in a state in which the air conditioning outflow port is opened, a fully closed mode in which all of a bypass outflow port through which the cooling water is supplied to the bypass flow path, the radiator outflow port, and the air conditioning outflow port are closed, and a switching mode in which opening and closing of the air conditioning outflow port are switched in a state in which at least one outflow port of the radiator outflow port and the bypass outflow port is opened,
   an opening degree control unit configured to switch between the heater cut mode and the heater passing water mode via the switching mode, and
   the opening degree control unit switches between the heater cut mode and the heater passing water mode without passing through the fully closed mode and with passing through the switching mode when a water temperature of the cooling water exceeds a specified value.

2. The cooling system according to claim 1, wherein the opening degree control unit switches between the heater cut mode and the heater passing water mode with passing through the fully closed mode when the water temperature of the cooling water is the specified value or less.

3. The cooling system according to claim 1, wherein the switching mode is a mode in which at least the radiator outflow port is opened.

4. The cooling system according to claim 3, wherein the switching mode is a mode in which the bypass outflow port is also open in addition to the radiator outflow port.

5. A cooling system comprising:
- a cooling flow path through which cooling water flows to cool an engine;
- a plurality of branch flow paths through which the cooling water discharged through an outlet of the cooling flow path is returned to an inlet of the cooling flow path and which have a radiator flow path including a radiator configured to radiate heat of the cooling water, an air conditioning flow path including an air conditioning heater, and a bypass flow path including a device configured to exchange heat with the cooling water;
- a control valve provided at a branching place in the plurality of branch flow paths; and
- a control apparatus configured to control the control valve, wherein
- the control valve includes an inflow port into which the cooling water discharged through the outlet of the cooling flow path flows and a plurality of outflow ports through which the cooling water flowing into the inflow port is supplied to the plurality of branch flow paths and changes a degree of opening of each of the plurality of outflow ports in accordance with control performed by the control apparatus,
- the control apparatus includes: an opening schedule data storage unit configured to store opening schedule data indicating an opening schedule of the degree of opening of each of the plurality of outflow ports of the control valve including at least a heater cut mode in which a radiator outflow port through which the cooling water is supplied to the radiator flow path is opened in a state in which an air conditioning outflow port through which the cooling water is supplied to the air conditioning flow path is closed, a heater passing water mode in which the radiator outflow port is opened in a state in which the air conditioning outflow port is opened, a fully closed mode in which all of a bypass outflow port through which the cooling water is supplied to the bypass flow path, the radiator outflow port, and the air conditioning outflow port are closed, and a switching mode in which opening and closing of the air conditioning outflow port are switched in a state in which at least one outflow port of the radiator outflow port and the bypass outflow port is opened,
- an opening degree control unit configured to switch between the heater cut mode and the heater passing water mode via the switching mode, and
- the opening degree control unit switches between the heater cut mode and the heater passing water mode with passing through the fully closed mode when a water temperature of the cooling water is a specified value or less.

* * * * *